(12) United States Patent
Baek et al.

(10) Patent No.: US 11,638,207 B2
(45) Date of Patent: *Apr. 25, 2023

(54) METHOD AND APPARATUS FOR SELECTING AN ACCESS AND MOBILITY MANAGEMENT FUNCTION IN A MOBILE COMMUNICATION SYSTEM

(71) Applicant: Samsung Electronics Co., Ltd., Gyeonggi-do (KR)

(72) Inventors: Youngkyo Baek, Seoul (KR); Sunghoon Kim, Seoul (KR); Hoyeon Lee, Seoul (KR); Jungje Son, Gyeonggi-do (KR)

(73) Assignee: Samsung Electronics Co., Ltd

( * ) Notice: Subject to any disclaimer, the term of this patent is extended or adjusted under 35 U.S.C. 154(b) by 90 days.

This patent is subject to a terminal disclaimer.

(21) Appl. No.: 17/237,689

(22) Filed: Apr. 22, 2021

(65) Prior Publication Data

US 2021/0243686 A1 Aug. 5, 2021

Related U.S. Application Data

(63) Continuation of application No. 16/741,034, filed on Jan. 13, 2020, now Pat. No. 10,993,178, which is a
(Continued)

(30) Foreign Application Priority Data

Jan. 9, 2017 (KR) .................. 10-2017-0002945

(51) Int. Cl.
*H04W 48/18* (2009.01)
*H04W 16/14* (2009.01)
(Continued)

(52) U.S. Cl.
CPC .......... *H04W 48/18* (2013.01); *H04W 16/14* (2013.01); *H04W 28/0842* (2020.05);
(Continued)

(58) Field of Classification Search
CPC . H04W 48/18; H04W 16/14; H04W 28/0842; H04W 48/06; H04W 72/02;
(Continued)

(56) References Cited

U.S. PATENT DOCUMENTS 10,638,415 B2 * 4/2020 Baek ................ H04W 28/0842
2008/0098467 A1 4/2008 Miller
(Continued)

FOREIGN PATENT DOCUMENTS

CN 101689114 3/2010
CN 103096309 5/2013
(Continued)

OTHER PUBLICATIONS

3rd Generation Partnership Project; Technical Specification Group Services and System Aspects; Study on Architecture for Next Generation System, (Release 14), 3GPP TR 23.799 V1.1.0, Oct. 31, 2016, 501 pages.
(Continued)

*Primary Examiner* — Huy C Ho
(74) *Attorney, Agent, or Firm* — The Farrell Law Firm, P.C.

(57) ABSTRACT

The present disclosure relates to a communication technique of fusing a 5G communication system for supporting higher data transmission rate beyond a 4G system with an IoT technology and a system thereof, and provides an intelligent service based on the 5G communication technology and the IoT related technology. A method performed by an access network entity in a wireless communication system includes receiving, from a terminal in the wireless communication
(Continued)

system, a first message including first information for identifying an AMF, the first information including an AMF set identifier and an AMF identifier; selecting an AMF set based on the AMF set identifier; selecting an AMF from the selected AMF set; and transmitting, to the terminal, a second message as a response to the first message. The AMF set includes a plurality of AMFs based on network slices the AMFs each support, and the AMF set identifier is an identifier of the AMF set, and the AMF identifier is an identifier of an AMF within the AMF set.

16 Claims, 22 Drawing Sheets

Related U.S. Application Data continuation of application No. 15/866,091, filed on Jan. 9, 2018, now Pat. No. 10,638,415.

(51) Int. Cl.

| | |
|---|---|
| *H04W 72/02* | (2009.01) |
| *H04W 48/06* | (2009.01) |
| *H04W 28/08* | (2023.01) |
| *H04W 8/02* | (2009.01) |
| *H04W 48/16* | (2009.01) |
| *H04W 76/10* | (2018.01) |

(52) U.S. Cl.
CPC .......... *H04W 48/06* (2013.01); *H04W 72/02* (2013.01); *H04W 8/02* (2013.01); *H04W 48/16* (2013.01); *H04W 76/10* (2018.02)

(58) Field of Classification Search
CPC ....... H04W 8/02; H04W 48/16; H04W 76/10; H04W 8/06; H04W 60/00; Y02D 30/70
USPC ...................................................... 455/452.1
See application file for complete search history.

(56) References Cited

U.S. PATENT DOCUMENTS

| | | | |
|---|---|---|---|
| 2008/0275973 | A1 | 11/2008 | Toeroe |
| 2011/0022843 | A1 | 1/2011 | Blom et al. |
| 2014/0233736 | A1 | 8/2014 | Zhang et al. |
| 2016/0330749 | A1 | 11/2016 | Mehrabanzad |
| 2016/0353465 | A1 | 12/2016 | Vrzic et al. |
| 2017/0171752 | A1 | 6/2017 | Lee |
| 2017/0303259 | A1 | 10/2017 | Lee |
| 2018/0041904 | A1 | 2/2018 | Shimojou et al. |
| 2018/0167983 | A1 | 6/2018 | Salkintzis |
| 2018/0199279 | A1* | 7/2018 | Baek ............... H04W 48/06 |
| 2018/0227978 | A1 | 8/2018 | Keller |
| 2018/0332523 | A1 | 11/2018 | Faccin |
| 2018/0376446 | A1 | 12/2018 | Youn |
| 2019/0037516 | A1 | 1/2019 | Kim |
| 2019/0037636 | A1 | 1/2019 | Kim |
| 2019/0075452 | A1* | 3/2019 | Avula ............... H04W 64/003 |
| 2019/0166467 | A1 | 5/2019 | Livanos |
| 2019/0208573 | A1* | 7/2019 | Yang ............... H04L 41/042 |
| 2019/0223093 | A1 | 7/2019 | Watfa |
| 2019/0239071 | A1 | 8/2019 | Krishnan |
| 2019/0357129 | A1 | 11/2019 | Park |
| 2019/0357130 | A1 | 11/2019 | Garcia Azorero et al. |
| 2019/0387576 | A1 | 12/2019 | Yang |
| 2020/0059989 | A1 | 2/2020 | Velev et al. |

FOREIGN PATENT DOCUMENTS

| | | |
|---|---|---|
| EP | 3 358 887 | 8/2018 |
| WO | WO 2016/152588 | 9/2016 |

OTHER PUBLICATIONS

Vinod Kumar Choyi et al., "Network Slice Selection, Assignment and Routing Within 5G Networks", 2016 IEEE Conference on Standards for Communications and Networking (CSCN), Oct. 31-Nov. 2, 2016, 7 pages.
ETRI, Solution for Network Function Selection Within a Network Slice, S2-161447, SA WG2 Meeting #114, Apr. 11-15, 2016, 3 pages.
International Search Report dated Apr. 16, 2018 issued in counterpart application No. PCT/KR2018/000354, 3 pages.
Interim agreement: Determination of NSSAI based on UE policy, S2-166603, SA WG2 Meeting #118, Nov. 14-28, 2016, 3 Pages.
European Search Report dated Nov. 22, 2019 issued in counterpart Application No. 18736140.7-1214, pp. 16.
Qualcomm Incorporated, "Further details on slice selection and NG Flex", 3GPP TSG-RAN WG3 Meeting #94, R3-162827, Nov. 14-18, 2016, pp. 2.
Nokia et al., "Updates on Control plane interconnection model with a data layer", SA WG2 Meeting #118, S2-166577, Nov. 14-18, 2016, pp. 20.
Motorola Mobility et al., "Updates to Solution 8.7: Support standalone non-3GPP access via NG2/NG3", SA WG2 Meeting #118, S2-166380, Nov. 14-28, 2016, pp. 16.
Huawei, "Discussion on Open issues of Decor", 3GPP TSG-RAN3 Meeting #90, R3-152500, Nov. 16-20, 2015, pp. 2.
LG Electronics Inc., "Consideration on network slice in NR", 3GPP TSG-RAN WG3 Meeting #93bis, R3-162474, Oct. 10-14, 2016, pp. 5.
Nokia et al. "TS 23.501: AMF Selection", SA WG2 Meeting #121, S2-173966, May 15-19, 2017, pp. 2.
Chinese Office Action dated Dec. 30, 2020 issued in counterpart application No. 201880006377.4, 26 pages.
InterDigital et al., "Proposed Interim Agreement for CCNF Redirection at Attach", SA WG2 Meeting #118, S2-166524, Nov. 14-18, 2016, 5 pages.
Chinese Office Action dated Feb. 10, 2021 issued in counterpart application No. 201880006377.4, 26 pages.
InterDigital, ZTE, Telecom Italia, Samsung, "Update to Solution 6.1.2 for Network Slicing", S2-166750, SA WG2 Meeting #118, Nov. 14-18, 2016, 6 pages.
Nokia et al., "Solution for Selection of Network Slice and CN Entity", R3-161861, 3GPP TSG-RAN WG3 Meeting #93, Aug. 22-26, 2016, 9 pages.
Samsung, "Discussion on CCNF Relocation", S2~170279, 3GPP SA WG 2 Meeting#118bis, Jan. 16-20, 2017, 5 pages.
3GPP, 3rd Generation Partnership Project; Technical Specification Group Services and System Aspects; Procedures for the 5G System; Stage 2; (Release 15), 3GPP TS 23.502 V0.1.1, Jan. 2017, 46 pages.
Samsung, "Update on Network Slicing Interim Aggreements—RAN Behaviour", S2-166667, SA WG2 Meeting #118, Nov. 14-18, 2016, 5 pages.
European Search Report dated Oct. 11, 2021 issued in counterpart Application No. 21180775.5-1212, 13 pages.
Japanese Office Action dated Nov. 15, 2021 issued in counterpart Application No. 2019-537262, 6 pages.
European Search Report dated Nov. 9, 2022 issued in counterpart Application No. 22184359.2-1216, 13 pages.

* cited by examiner

METHOD AND APPARATUS FOR SELECTING AN ACCESS AND MOBILITY MANAGEMENT FUNCTION IN A MOBILE COMMUNICATION SYSTEM

PRIORITY

The present application is a continuation of U.S. application Ser. No. 16/741,034, which was filed in the U.S. Patent and Trademark Office (USPTO) on Jan. 13, 2020, which is a continuation of U.S. application Ser. No. 15/866,091, which was filed in the USPTO on Jan. 9, 2018, issued as U.S. Pat. No. 10,638,415 on Apr. 28, 2020, and claims priority under 35 U.S.C. § 119(a) to Korean Patent Application Serial No. 10-2017-0002945, which was filed in the Korean Intellectual Property Office on Jan. 9, 2017, the entire disclosure of each of which is incorporated herein by reference.

BACKGROUND

1. Field of the Disclosure

The present disclosure relates generally to an apparatus and method for selecting an access and mobility management function (AMF).

2. Description of the Related Art

To meet an increasing demand for radio data traffic, efforts have been made to develop an improved $5^{th}$ Generation (5G) communication system or a pre-5G communication system. The 5G communication system or the pre-5G communication system may be referred to as a beyond 4G network communication system or a post LTE system.

To achieve a high data transmission rate, the 5G communication system is considered to be implemented in a very high frequency (mmWave) band (e.g., 60 GHz band).

To relieve path loss of a radio wave and increase a transfer distance of the radio wave in the very high frequency band, in the 5G communication system, beamforming, massive multiple input, multiple output (mMIMO), full dimensional MIMO (FD-MIMO), array antennas, analog beam-forming, and large scale antenna technologies have been discussed.

Further, to improve a network of the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMPs), and reception interference cancellation have been developed.

In addition, in the 5G system, hybrid frequency shift keying (FSK) and quadrature amplitude modulation (QAM) (FQAM) and sliding window superposition coding (SWSC), which are advanced coding modulation (ACM) schemes, and a filter bank multi carrier (FBMC), a non-orthogonal multiple access (NOMA), and a sparse code multiple access (SCMA), which are advanced access technologies, etc., have been developed.

Additionally, the Internet has evolved from a human-centered connection network through which a human being generates and consumes information to an Internet of things (IoT) network that transmits/receives information between distributed components, i.e., things, and processes the information.

Internet of everything (IoE) technology in which the big data processing technology, etc., is combined with the IoT technology by connection with a cloud server, etc., has also emerged.

To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things have been researched.

In an IoT environment, an intelligent Internet technology (IT) service that creates a new value in human life by collecting and analyzing data generated in the connected things may be provided. The IoT may apply for fields, such as a smart home, a smart building, a smart city, a smart car or a connected car, a smart grid, health care, smart appliances, and an advanced healthcare service, by fusing and combining existing IT with various industries.

Therefore, various attempts have been made to apply the 5G communication system to the IoT network. For example, 5G communication technologies, such as the sensor network, M2M, and MTC, have been implemented by different techniques, such as beamforming, MIMO, and an array antenna.

The application of a cloud RAN as the big data processing technology described above may also be considered as an example of the fusing of 5G communication technology with IoT technology.

With the development of 5G communication technology, a method is required for providing an efficient service in the 5G mobile communication environment by allowing a user to quickly find network providing services that are desired by the user equipment, when the user equipment initially accesses the 5G network.

SUMMARY

Accordingly, the present disclosure is made to address at least the problems and/or disadvantages described above and to provide at least the advantages described below.

An aspect of the present disclosure is to provide a method and an apparatus for finding a network node providing services desired by a user equipment (UE) in a 5G mobile communication system, when the UE initially accesses a 5G network. To this end, we propose a method for managing network deployment information and a method for transmitting an initial access request message with a detailed proposal technology.

In addition, even when the service provided to the user equipment is modified after the initial access, a network node providing the corresponding service may be found in a similar manner.

Embodiments of the present disclosure are directed to the provision of a method for separately managing a mobility restriction area for each network slice used by a terminal, in allocating and managing the mobility restriction area for a service control according to mobility of the terminal. A mobile communication service provider may configure different network slices for each service provided to the terminal, and may provide different restriction areas for each network slice. In addition, an operation of requesting, by the terminal, a data service in consideration of the mobility restriction areas allocated to each network slice or considering the mobility restriction area when a session for the corresponding network slice is established in the terminal in a core network of the 5G system is proposed. In addition, an operation of locating a network slice capable of establishing a session at a current location of the terminal based on the mobility restriction area and establishing the session when the terminal is using multiple network slices is proposed.

Embodiments of the present disclosure are directed to the provision of a method for selecting an appropriate AMF to solve problems of making routing of NAS signaling unnecessarily complicated when a selection of the AMF is wrong according a relationship between a PLMN serving N3IWF in a non-3gpp access and a PLMN that a terminal accesses in a 3gpp access, as a method for effectively selecting an AMF for an access accessing a 5G network later when the terminal access to the 5G network through another access in a case in which the UE capable of the non-3gpp access and the 3gpp access accesses the 5G network through one access.

In addition, according to the existing LTE network configuration, since the base station selects an MME using GUMMEI as routing information which is an ID of the MME allocating GUTI to a terminal while the base station selects the MME and the MME allocating the GUTI should continuously have context information of the corresponding terminal for the selection, the selection of the MME increases stickiness or persistence with information of UE such that the problem in which it is difficult to manage a network such as network update in the MME or the like. Therefore, the present disclosure introduces a method for reducing the stickiness or persistence with the information of the UE.

Objects of the present disclosure are not limited to the above-mentioned objects. That is, other objects that are not mentioned may be obviously understood by those skilled in the art to which the present disclosure pertains from the following description.

In accordance with an aspect of the present disclosure, a method is provided for a terminal in a wireless communication system. The method includes receiving, from an access and mobility management function (AMF), a first message including first information for identifying the AMF, the first information being assigned upon a successful registration to a first access; determining whether a second access is located in a same public land mobile network (PLMN) of the first access; and transmitting, to an access network entity of the second access, a second message requesting registration to the second access and including second information for identifying the AMF, in case that the second access is located in the same PLMN of the first access. The second information includes at least a part of the first information and is used by the access network entity of the second access to select the AMF.

In accordance with another aspect of the present disclosure, a terminal is provided for use in a wireless communication system. The terminal includes a transceiver, and a controller coupled with the transceiver and configured to receive, from an access and mobility management function (AMF), a first message including first information for identifying the AMF, the first information being assigned upon a successful registration to a first access, determine whether a second access is located in a same public land mobile network (PLMN) of the first access, and transmit, to an access network entity of the second access, a second message requesting registration to the second access and including second information for identifying the AMF, in case that the second access is located in the same PLMN of the first access. The second information includes at least a part of the first information and is used by the access network entity of the second access to select the AMF.

In accordance with another aspect of the present disclosure, a method is provided for an access network entity of a first access in a wireless communication system. The method includes receiving, from a terminal, a message requesting registration to the first access and including first information for identifying an access and mobility management function (AMF), in case that the first access is located in the same PLMN of a second access; and selecting the AMF based on the first information. The first information includes at least a part of the second information. The second information for identifying the AMF is received by the terminal from the AMF, the second information being assigned upon a successful registration to the second access.

In accordance with another aspect of the present disclosure, an access network entity of a first access is provided for use in a wireless communication system. The access network entity includes a transceiver; and a controller coupled with the transceiver and configured to receive, from a terminal, a message requesting registration to the first access and including first information for identifying an access and mobility management function (AMF), in case that the first access is located in the same PLMN of a second access; and select the AMF based on the first information. The first information includes at least a part of the second information. The second information for identifying the AMF is received by the terminal from the AMF, the second information being assigned upon a successful registration to the second access.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
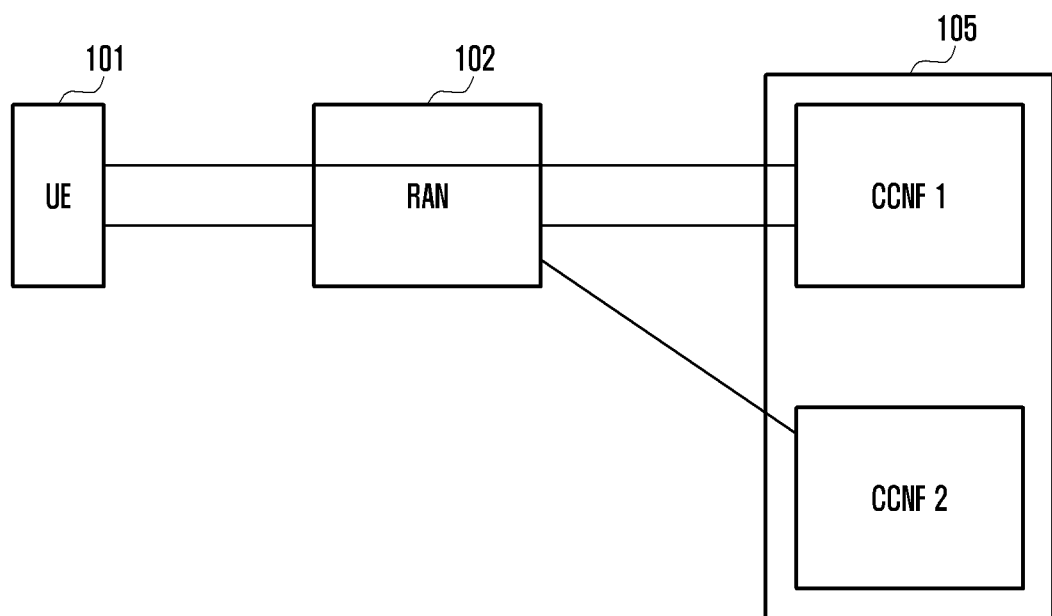
FIG. 1 illustrates a system including a terminal, a RAN, and a core network (CN) node, according to an embodiment of the present disclosure.

Hereinafter, various embodiments of the present disclosure will be described in detail with reference to the accompanying drawings. However, the present disclosure is not limited to the embodiments disclosed herein but may be implemented in various forms.

Like reference numerals may denote like elements in the accompanying drawings. Further, detailed descriptions related to well-known functions or configurations will be omitted to avoid obscuring the subject matter of the present disclosure.

In describing embodiments of the present disclosure, an advanced evolved universal terrestrial radio access (E-UTRA) (or referred to as long term evolution-Advanced (LTE-A)) system supporting carrier aggregation (CA) will be mainly described. However, the present disclosure may be applied to other communication systems having similar technical backgrounds and channel forms without departing from the scope of the present disclosure, which may be determined by those skilled in the art to which the present disclosure pertains. For example, the present disclosure may also be applied to a multicarrier high speed packet access (HSPA) system supplying carrier aggregation.

In describing the exemplary embodiments of the present disclosure in the present specification, a description of technical contents which are well known to the art to which the present disclosure belongs and are not directly connected with the present disclosure will be omitted. This is to more clearly transfer a gist of the present disclosure by omitting an unnecessary description.

Some components may be exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

Each block or signal of the flow charts and combinations of the flow charts may be performed by computer program instructions. Because these computer program instructions may be mounted in processors for a general computer, a special computer, or other programmable data processing apparatuses, these instructions executed by the processors for the computer or the other programmable data processing apparatuses create devices performing the functions described in the flow charts.

Because computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instructions for performing the functions described in the flow charts.

Because the computer program instructions may also be mounted on the computer or the other programmable data processing apparatuses, instructions performing a series of operation steps on the computer or the other programmable data processing apparatuses to create processes executed by the computer to thereby execute the computer or the other programmable data processing apparatuses may also provide steps for performing the functions described in the flow charts.

In addition, each block may indicate some of modules, segments, or codes including one or more executable instructions for executing a specific logical function(s). Further, functions mentioned in the blocks occur regardless of a sequence in some alternative embodiments. For example, two blocks that are contiguously illustrated may be simultaneously performed in fact or be performed in a reverse sequence depending on corresponding functions.

Herein, the term "unit" indicates software or hardware components, such as a field-programmable gate array (FPGA) and an application-specific integrated circuit (ASIC). However, the meaning of the "unit" is not limited to software or hardware. For example, a "unit" may be configured to be in a storage medium that may be addressed and may also be configured to be reproduced one or more processor. Accordingly, a "unit" may include components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the "units" may be combined with a smaller number of components, and the "units" or may be further separated into additional components and "units". In addition, the components and the "units" may also be implemented to reproduce one or more central processing units (CPUs) within a device or a security multimedia card.

First Embodiment

In describing a first embodiment, a slice, a service, a network slice, a network service, an application slice, an application service, and the like may be used in combination.

FIG. 1 illustrates a mobile communication network and an initial access structure of user equipment. A RAN 102 corresponding to a first node of a wireless section may have a connection with a node of a CN 105, regardless of whether a terminal (or UE) 101 is connected or not.

Referring to FIG. 1 as an example, the RAN 102 is connected to a common core network function(s) (CCNF) 1 and a CCNF2, respectively. The CCNF is a representative network function of a core network (CN) connected to the RAN, and may be one network function or a set of several network functions. If the terminal 101 requests an initial access to a mobile communication network (e.g., an initial attach request or an initial access request), the RAN 102 receiving the corresponding request transmits the corresponding message to the appropriate CCNF. Referring to FIG. 1 as an example, the RAN 102 receiving an initial access request message from the terminal 101 transmits the corresponding message to the CCNF1, and a connection between the UE 101 and the CCNF1 is setup by an authorization procedure. A detailed procedure will be described with reference to FIG. 8.

Figure 2:
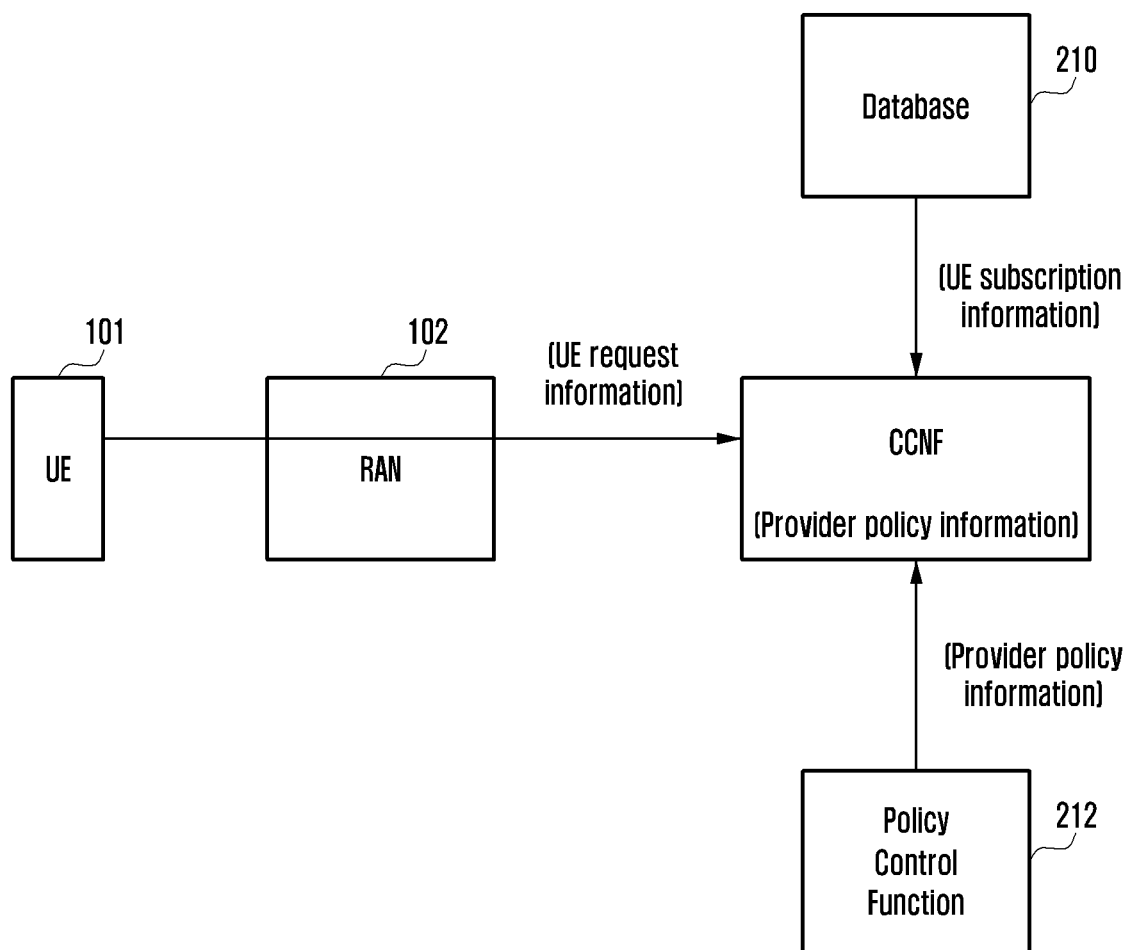
FIG. 2 illustrates a CN node obtaining information, according to an embodiment of the present disclosure.

The CCNF receiving the initial access request message of the terminal 101 identifies whether the corresponding CCNF can provide a service that the UE wants. For this purpose, three information is used, which is illustrated in FIG. 2. The CCNF identifies and verifies whether the corresponding CCNF is a node capable of providing a service that the terminal wants based on UE request information included in the initial access request message of the terminal 101, UE subscription information stored in a database 210 of the mobile communication network, and policy (e.g., local policy, or operator policy, or PLMN policy) information of a mobile communication network operator. The provider policy information may be stored and used by the CCNF, or may be received from another network function (e.g., a policy control function 212) that stores a user policy. The UE request information may include a network slice (service) type that a user wants, an application slice (service) type, a service provider providing a slice (service), priority of each slice (service), and location information of a user. If there are several services that a user wants, the UE request information may include one value representing the services. This representative value may be stored in the terminal 101, the RAN 102, and the core network 105, so that the RAN 102 and the core network 105 may interpret which services the one value transmitted by the terminal 101 corresponds to.

This one value may be preconfigured in the terminal 101, or the terminal 101 may receive and use the corresponding information after connecting to the network. At this time, the user request information may be information that is explicitly input by the user (e.g., a service that a user wants) and may be automatically included according to a protocol design (e.g., tracking area, cell id information, etc., indicating location information of a user). The UE subscription information includes at least one of a network slice (service) type that may be used by the terminal 101, an application slice (service) type that the terminal 101 may use, a slice (service) provider providing a service, a slice (service) type that the terminal 101 uses, an area (region) where each slice (service) type may be provided, an area (region) where each slice (service) type should not be provided, and priority of each slice (service). Based on these types of information, the CCNF determines a final service to be provided to the terminal 101. The final slice (service) to be provided to the terminal 101 confirmed by the network may be the same as or different from the terminal request slice (service) included in the initial access request message transmitted by the terminal 101.

When the CCNF receiving the initial access request message verifies that it is an appropriate node for providing the service to the terminal 101, CCNF transmits an initial access request acknowledgment (e.g., an initial attach response or an initial access response) message to the terminal 101. The initial access request acknowledgment message may include information indicating the final service information confirmed by the network to be provided to the terminal 101. The terminal 101 receiving the corresponding message identifies that the network access request of the terminal 101 is processed well and identifies what service is available in the future. If the CCNF is not appropriate, it should find another suitable CCNF that is capable of providing a service to the terminal 101. There are two methods for finding other CCNFs, and FIGS. 3 and 4 illustrate each method.

In order for the CCNF to find other CCNFs, the CCNF should know what services other CCNFs provide.

Figure 3:
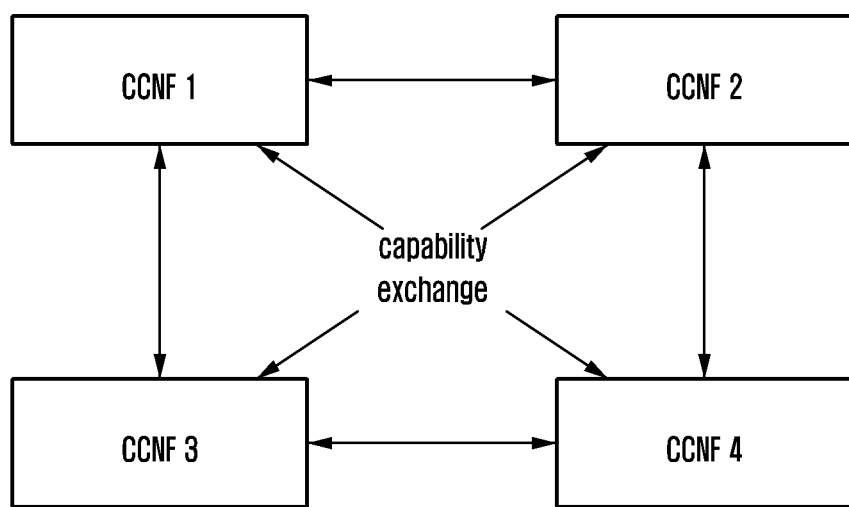
FIG. 3 illustrates an information exchange between common core network functions (CCNFs), according to an embodiment of the present disclosure.

FIG. 3 illustrates a method in which several CCNFs that exist in a network, and illustrates a method for knowing function information provided by each CCNF by allowing each CCNF to directly exchange information with each other. In this case, the connection between the respective CCNFs may be a direct connection or an indirect connection via another network function. If a function that a specific CCNF provides is changed, the change should be informed to the other CCNFs. For example, if the CCNF2 provides services 1 and 2 and then additionally provides service 3, this information should be informed to each of neighboring CCNF1, CCNF3, and CCNF4 that are connected to the CCNF2. The CCNFs receiving the corresponding information update the neighboring CCNF information that they manage. To inform the information, a method for transmitting a message and an event-subscription method are provided. For example, if the CCNF1 receiving the initial access message of the user terminal determines that it is not able to support the final service to be provided to the terminal 101, based on the verification of FIG. 2, the CCNF1 may determine that the CCNF2 can support the corresponding final service based on other CCNF information that the CCNF1 manages.

Figure 4:
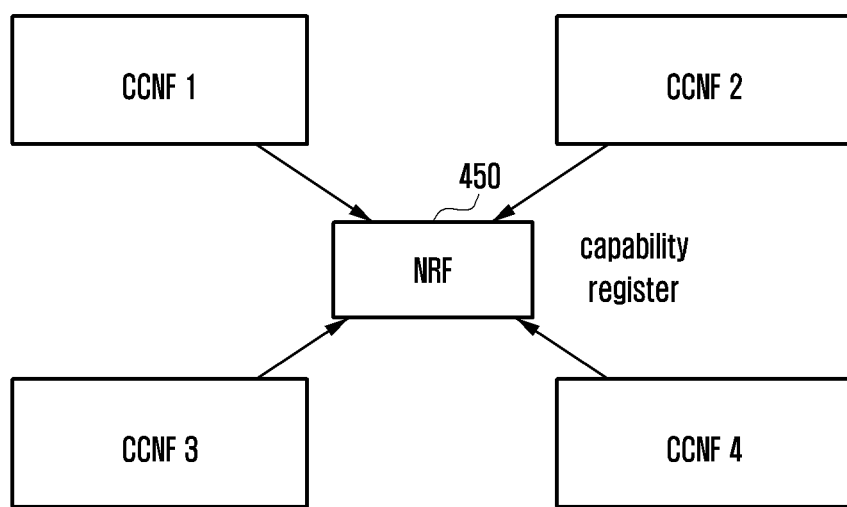
FIG. 4 illustrates a method for CCNFs to register information in a central server, according to an embodiment of the present disclosure.

On the other hand, FIG. 4 illustrates a method for registering each provision function to a central server, not a method in which each CCNF directly exchanges information. For example, the CCNF1, CCNF2, CCNF3, and CCNF4 each register their provision functions to the central server (i.e., a network function repository (NRF) 450). With this method, the CCNFs do not need to know the functions of the neighboring CCNFs. Accordingly, when the CCNF1 receives the initial access message of the user terminal 101 and determines that it is not capable of supporting the final service to be provided to the terminal 101, through the verification process of FIG. 2, it asks the NRF 450 for a CCNF suitable to support the corresponding final service. Based on the information of the registered CCNF, the NRF 450 determines that CCNF2 is a suitable node and provides the CCNF1 with the information of the CCNF2.

Through the process so far, the appropriate CCNF capable of providing the final service is found, and the CCNF1 should transmit the initial access request message received from the terminal to CCNF2. There are three possible transmission methods, and each method is illustrated in FIGS. 5, 6, and 7.

Figure 5:
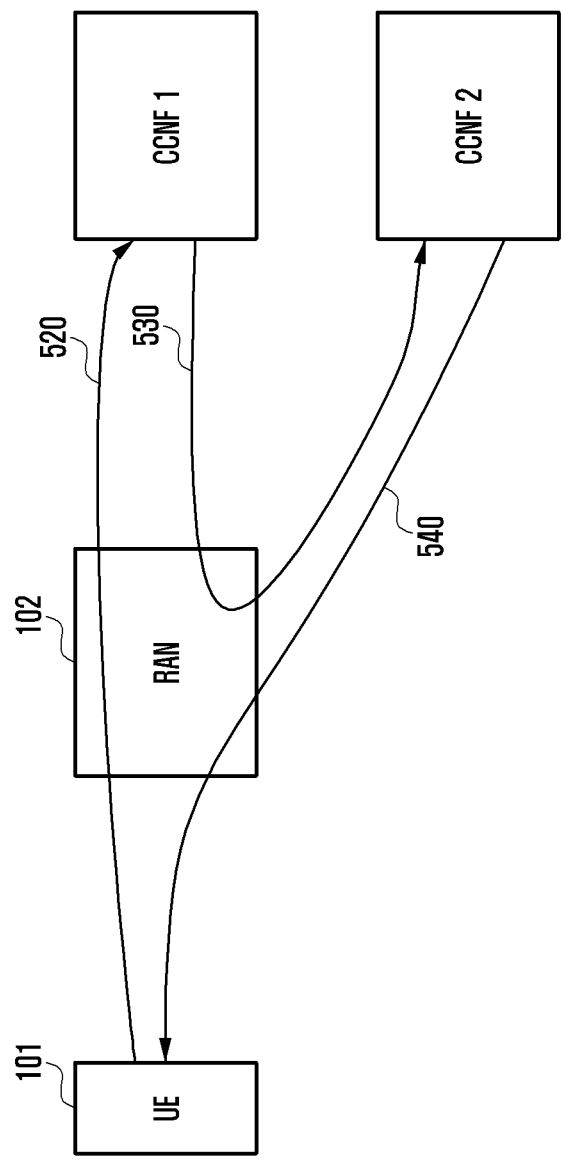
FIG. 5 illustrates a method for rerouting a message transmitted by a terminal through a RAN, according to an embodiment of the present disclosure.

FIG. 5 illustrates a method for transmitting a request message of the terminal 101 from the CCNF1 to the CCNF2 through the RAN 102. The CCNF1 sends a redirection request message 530 to the RAN 102. The redirection request message includes the information of the CCNF2 and may include an initial request message (e.g., an initial attach request) received from the terminal 101. The RAN 102 receiving the corresponding redirection message 530 transmits the initial request message of the terminal to the CCNF2 using the CCNF2 information. The CCNF2 receiving the corresponding message processes the received message and transmits a response message (e.g., an initial attach response) 540 to the terminal 101.

Figure 6:
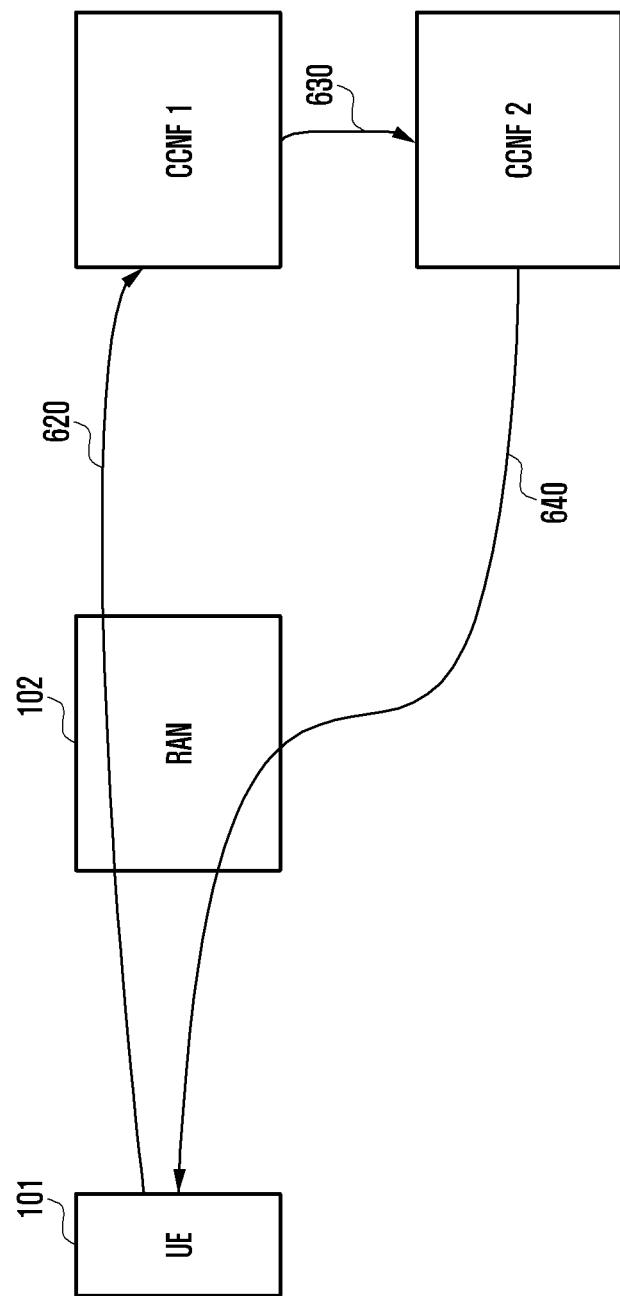
FIG. 6 illustrates a method for rerouting a message transmitted by a terminal to a CCNF and transmitting a response to a RAN, according to an embodiment of the present disclosure.

FIG. 6 illustrates a method for directly transmitting a redirection request message from the CCNF1 to the CCNF2. The CCNF1 transmits the redirection request message 630 to the CCNF2. The redirection message may include terminating point information (e.g., an NG2 signaling Id) of the RAN 102 connected to the terminal 101, and the initial request message received from the terminal 101. The CCNF2 receiving the corresponding message processes the message, and transmits a response message 640 to the terminal 101 at the corresponding point using the terminating point information of the RAN 102.

Figure 7:
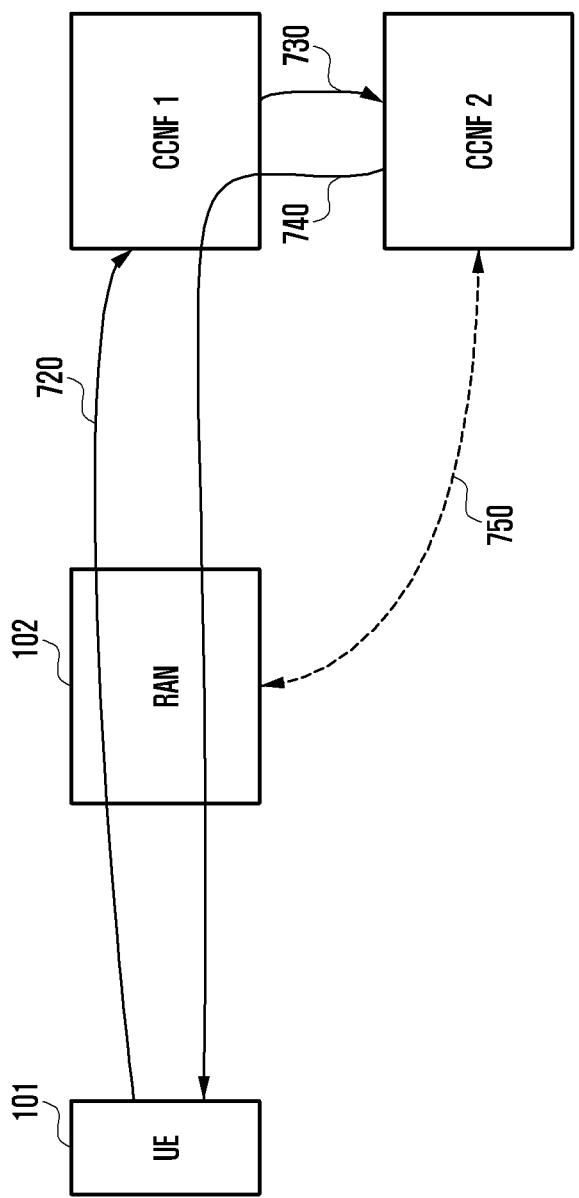
FIG. 7 illustrates a method for rerouting a message transmitted by a terminal to a CCNF and transmitting a response to an original CCNF, according to an embodiment of the present disclosure.

Similar to FIG. 6, FIG. 7 illustrates a method for directly transmitting a message from the CCNF1 to the CCNF2. The difference from FIG. 6 is that when the CCNF2 transmits the response message 740, it transmits the response message 740 via the CCNF1. The redirection request message 730 transmitted from the CCNF1 to the CCNF2 may include the initial request message received from the terminal 101. The CCNF2 receiving the corresponding message processes the message and transmits the response message 740 to the CCNF1. At this time, the CCNF2 may include the terminating point information to be communicated with the RAN 102 in the future. The CCNF1 receiving the response message 740 transmits the corresponding message to the RAN 102. The CCNF2 may transmit the terminating point information 750 to communicate with the RAN 102 in the future. The RAN 102 transmits the response message 740 to the terminal 101 and may establishes a connection 750 with the CCNF2 using the CCNF2 terminating point information.

That is, the CCNF1 transmits the message to the CCNF2 using one of the three methods shown in FIGS. 5, 6, and 7.

Figure 8:
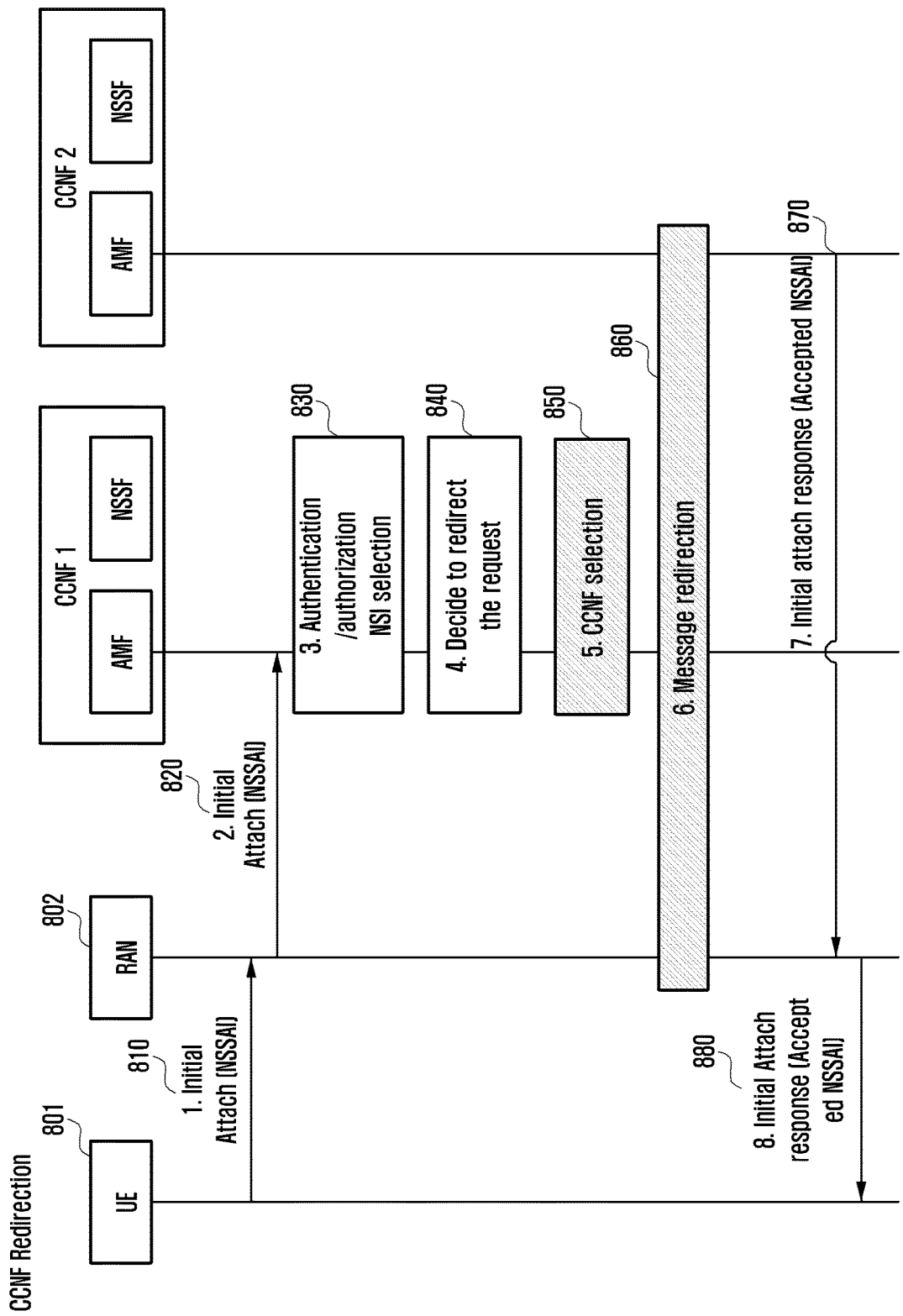
FIG. 8 is a signal flow diagram illustrating a method of rerouting a terminal initial access request message according to an embodiment of the present disclosure.

FIG. 8 illustrates the overall procedure of the embodiment described so far. When the user terminal 801 has a minimum access to a network, it sends an initial access request message in step 810. The initial access request message may include information such as a service type (NSSAI) desired by the terminal 801. A RAN 802 receiving the message selects the appropriate CCNF1 based on the NSSAI information and transmits the message in step 820. For example, this process is described above with reference to FIG. 1. In step 830, the CCNF1 authenticates whether the terminal 801 may access the corresponding PLMN. If authentication is successful, the network authenticates which service is available to the terminal. The final providing service is determined based on service information, subscription information, and provider policy information requested by the terminal 801. For example, this process is described above with reference to FIG. 2. The CCNF1 then determines if it may provide the final providing service. If CCNF1 determines that is may provide the final providing service, the CCNF1 transmits the initial attach response to the RAN and skips steps 850 to 870. The initial attach response may include the Accepted NSSAI, which identifies the final service information. However, if the CCNF1 determines that is a node that cannot provide the final provision service (840), the CCNF1 finds a CCNF capable of providing the final provision service (850). For example, the finding method may be determined based on the information that the CCNF1 already has (as illustrated in FIG. 3), or may be determined by a method for using an NRF (as illustrated in FIG. 4). If the method of FIG. 3 is used, because the CCNF1 determines a capable CCNF itself, there is no additional message flow. However, if the method of FIG. 4 is used, a message flow as illustrated in FIG. 9 may be performed.

Figure 9:
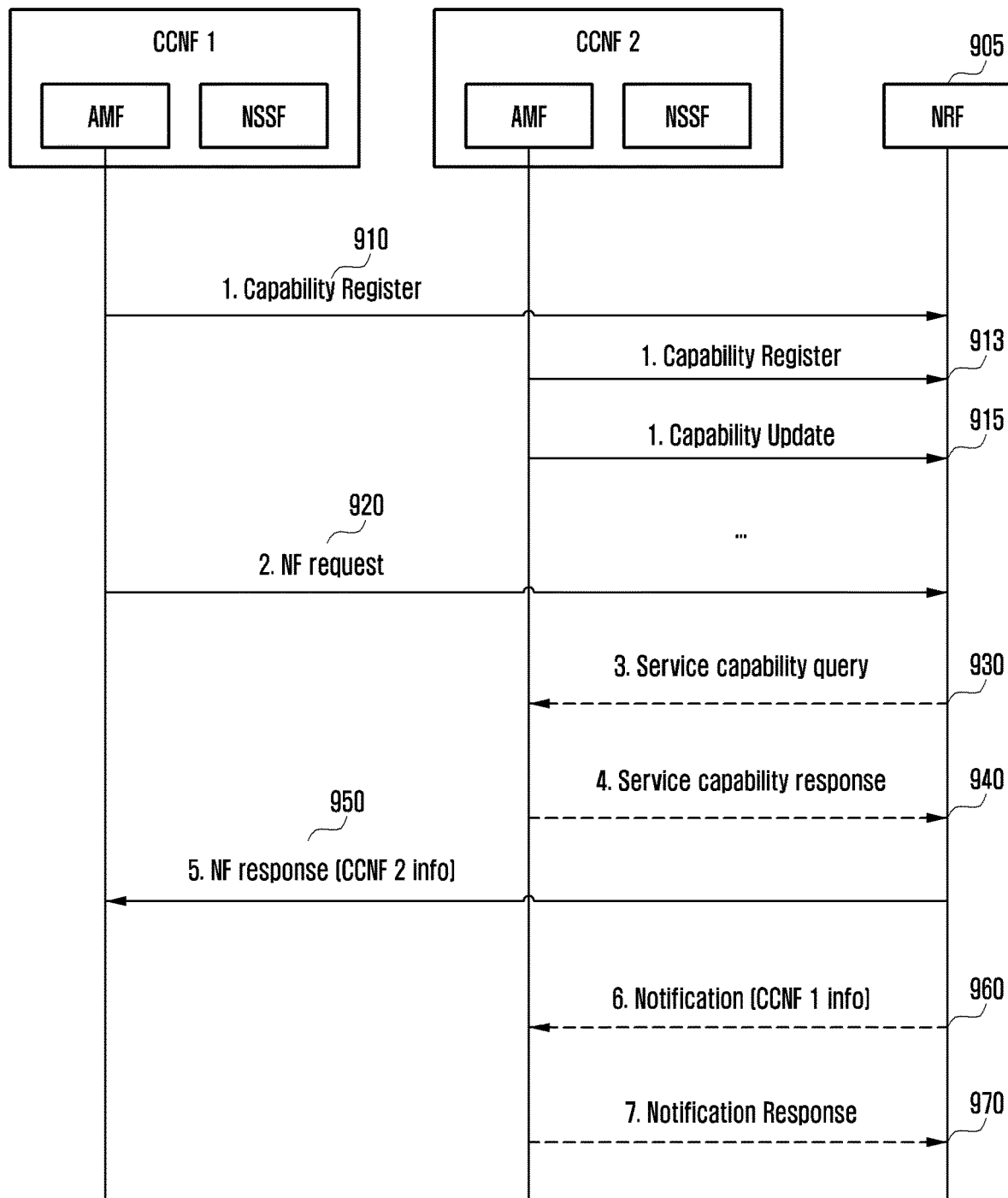
FIG. 9 is a signal flow diagram illustrating a method of a core network node information registration, a selection, and a discovery, according to an embodiment of the present disclosure.

Referring to FIG. 9, each CCNF registers its service provision capability in an NRF 905, which is the central server, in steps 910, 913, and 915. The NRF 905 stores and manages a profile of each CCNF. If the CCNF has changed its capability, it transmits an update message to the NRF 905 to keep the capability information managed by the NRF 905 up to date. In step 920, the CCNF1 transmits a network function (NF) request message to the NRF 905. The NF request message may include the required function of the CCNF that the CCNF1 wants to find. Based on the CCNF profile information, the NRF 905 finds the CCNF that the CCNF1 wants (e.g., CCNF2), and transmits the information included in the NF response in step 950. The NF information may include an address of the corresponding node (e.g., an Internet protocol (IP) address or Uniform Resource Locator (URL) information), an address of a node group of the same type having the corresponding capability (e.g., an IP address or a URL information representing the group), and a group ID. The CCNF1 may store the information transmitted to the NRF 905 for a certain period and reuse the stored information until the value of the corresponding information has expired. That is, when the same type of node information having the same capability is required in the near future, the stored information may be used without asking the NRF 905 again. Steps 930, 940, 960, and 970 may be optionally performed. In step 930, for the NRF 905 may confirm that the CCNF2 may provide the corresponding service, before the NRF 905 responds to the CCNF1 in step 950. The message including the capability to request the message of the step 930 may be transmitted. Alternatively, the NRF 905 may ask what capability there is, not including the requesting capability. In response to the query, the CCNF2 may include its own capability information in step 940, or may transmit the presence or absence of the capability requested in step 930. In step 960, the NRF 905 informs that the CCNF1 may be connected to CCNF2. In step 960, the CCNF1 information and a token for authentication may be included. Additionally, the token information may be included in step 950. When accessing the CCNF2 in the future, the CCNF1 may transmit a message, including the corresponding token. Thereafter, the CCNF2 is a node at which the NRF 905 authenticates the CCNF1 by comparing with the token information received in advance, and may perform communication by authenticating a node to which a service may be provided.

Referring again to FIG. 8, the message redirection corresponding to step 860 may be performed by the methods described in FIGS. 5, 6, and 7.

Figure 10:
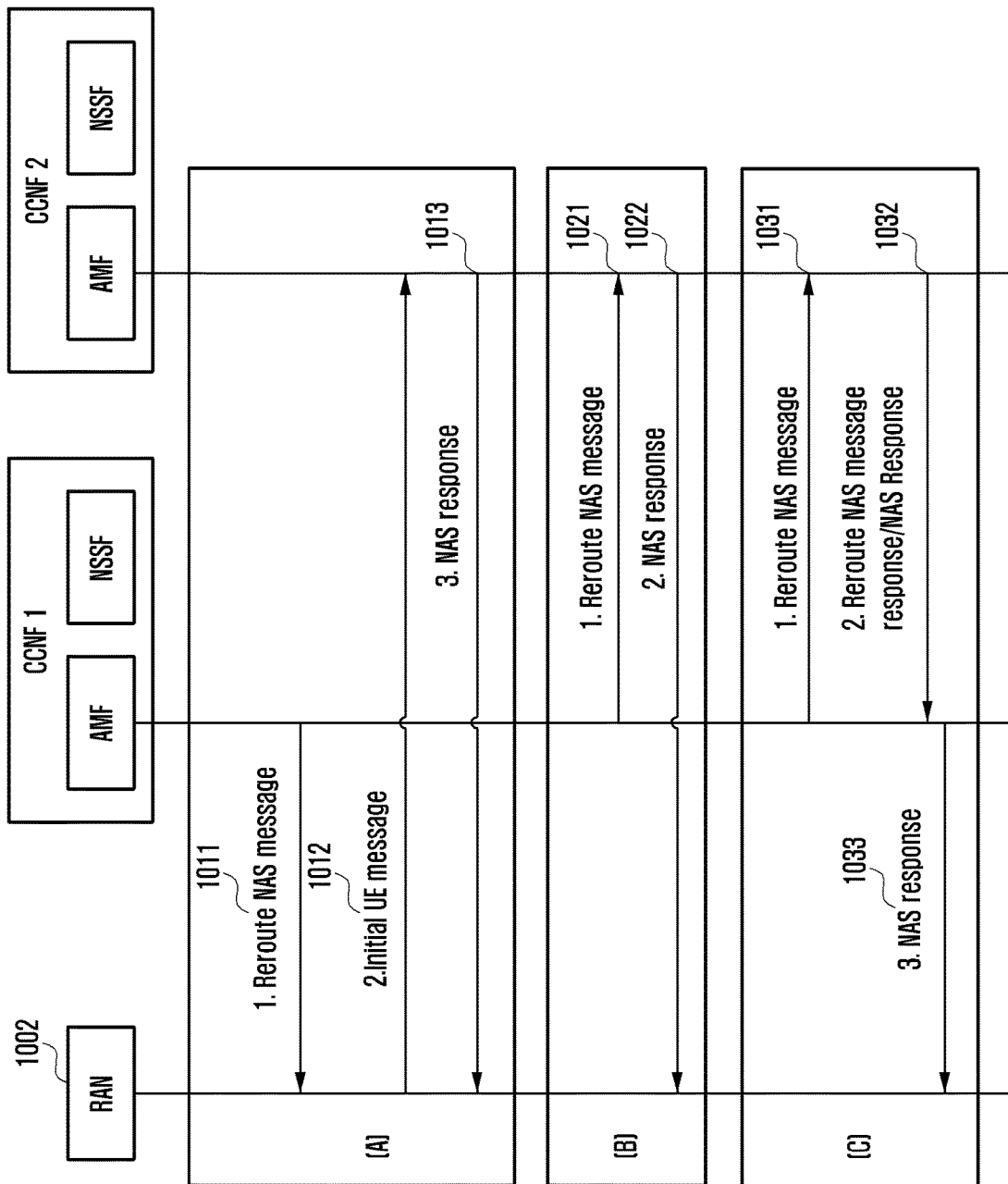
FIG. 10 is a signal flow diagram illustrating a method of rerouting a non-access stratum (NAS) message according to an embodiment of the present disclosure.

FIG. 10 illustrates a detailed message flow. Group A of FIG. 10 is a reroute method through the RAN described in FIG. 5. A value included in step 1011 of Group A of FIG. 10 includes information of the CCNF2, which is a node to which a RAN 1002 should reroute the message. The CCNF2 information may be an address or an id of the CCNF2, or an address or an ID of the group to which the CCNF2 belongs. Based on this information, the RAN 1002 finds the CCNF2 connected to the RAN 1002 and reroutes the message. In addition, if an NSSAI received from a terminal is changed in step 830 of FIG. 8, the changed NSSAI may be included. If step 830 of FIG. 8 is performed, security information indicating that the corresponding terminal is authenticated may also be included in step 1011. In addition, the terminal information and the subscriber information may be included. The RAN 1002 transmits a message to the CCNF2 in step 1012. If security information is included, the CCNF2 may confirm that the corresponding terminal has already been authenticated and may skip performing additional authentication. The CCNF2 receives and processes the terminal request message in step 1012, and transmits, to the RAN 1002, the message transmitted to the RAN including the NAS response in step 1013, if necessary. For example, step 1013 corresponds to step 870 of FIG. 8. In FIG. 8, the NAS response may be the initial attach response. Group B of FIG. 10 corresponds to FIG. 6. In step 1021, the CCNF1 directly transmits a reroute message to the CCNF2. The reroute message of step 1021 may include the terminating point information of the RAN 1002. In addition, if the NSSAI received from the terminal is changed in step 830 of FIG. 8, the changed NSSAI may be included. For example, step 1021 corresponds to step 870 of FIG. 8. Group C of FIG. 10 corresponds to FIG. 7. If the NSSAI received from the terminal is changed in step 830 of FIG. 8, the changed NSSAI may be included in step 1031. The CCNF2 receiving the reroute message transmits a response to the CCNF1 in step 1032, and the CCNF1 forwards the response to the RAN in step 1033. In group C, step 870 of FIG. 8 does not occur.

Upon the terminal initial access, the RAN 1002 determines an appropriate CCNF based on the information provided by the terminal. If the RAN 1002 finds the wrong CCNF, it means that the routing information stored in the RAN 1002 is wrong and there is a need to update the corresponding information. The information for updating the RAN information may be included in step 1011 of FIG. 10. Alternatively, information for updating the RAN information may be included in step 1013 or step 1022 of FIG. 10. Alternatively, information for updating the RAN information may be transmitted to the RAN 1002 in steps 1032 and 1033. Alternatively, the CCNF may be transmitted to the RAN 1002 using the flow described above and the separate message. The corresponding information may be the NSSAI, which is the information that the terminal requests, and an ID mapping of the CCNF supporting the corresponding NSSAI, or mapping information of the NSSAI and the CCNF group. The RAN 1002 receiving the corresponding information updates the managed routing table accordingly.

A UE connects to a RAN to access a device for performing a mobility management function of a 5G core network apparatus. Herein, this device may be replaced with a CCNF, which performs mobility management and terminal authentication, i.e., performs an access and mobility management function (AMF). AMF may refer to a function or an apparatus that is in charge of both the access of the RAN and the mobility management of the terminal. The CCNF is a comprehensive concept of network function or apparatus that includes AMF. The AMF (or the CCNF including the AMF) routes a session related message to the UE using a session management function (SMF). The CCNF is connected to the SMF, the SMF is connected to a user plane function (UPF) to allocate a user plane resource be provided to the UE, establishes a tunnel for transmitting data between the base station and the UPF. An AMF may refer to a core network apparatus providing the mobility management for the UE, i.e., an apparatus receiving the NAS message of the CCNF or the terminal having a different name. Herein a network slice instance is a service that a network including the CCNF, the SMF, and the UPF provides. For example, if a mobile communication service provider supports broadband communications services, it defines network service satisfying the requirements for broadband communications and configures the network service as the network slice instance to provide a service. When a mobile communication service provider supports an IoT service, it defines the network service satisfying the requirements for the IoT service and provides the network service as the network slice instance for IoT.

The 4G means 4G mobile communication and includes a radio access network technology called the LTE and a core network technology called an evolved packet core (EPC). The 5G means 5th generation mobile communication. The 5G radio access network technology is called a next generation RAN (NG-RAN), and the core network technology will be called a 5G system core.

A mobility restriction area indicates a set of area information that includes an allowed area in which a session is established according to a location of the terminal to transmit/receive data, a non-allowed area in which the session may not established and only control signaling is possible, and a forbidden area in which all mobile communication services are impossible.

A mobile communication service provider may configure different network slices for each service provided to the terminal, and may provide different restriction areas for each network slice. For example, a mobile communication service provider providing a mobile broadband service and an IoT service may provide services by configuring two services as different network slices. A mobile communication service provider may be limited so that the terminal may receive a service in a wide area through the mobility restriction area for a mobile broadband, and may apply the mobility restriction area so that the terminal may receive a data transmission/reception service in a specific area for the IoT.

Second Embodiment

In describing in detail a second embodiment, terms identifying an access node, terms indicating network entity, terms indicating messages, terms indicating an interface between network entities, terms indicating various types of identification information, and so on that are used in the following description are exemplified for convenience of explanation. Accordingly, the present disclosure is not limited to terms to be described below and other terms indicating objects having the equivalent technical meaning may be used.

For convenience of explanation, embodiments of present disclosure are described below using terms and names defined in the specification for the 5G system. However, the present disclosure is not limited to the terms and names, but may also be identically applied to the system according to other standards. In addition, non-3GPP access may be similarly applied to other accesses except the access through the 5G, including the WiFi access.

Figure 11:
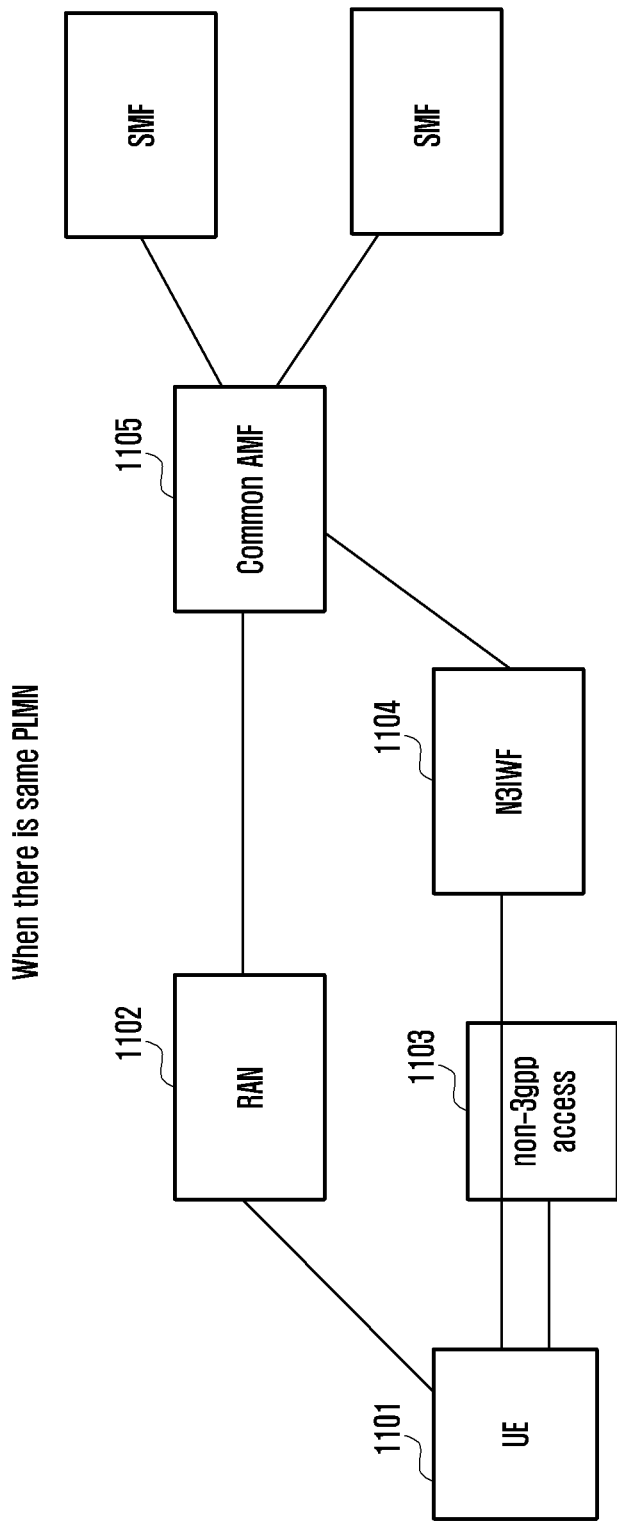
FIG. 11 illustrates a cellular network structure using a common AMF, wherein a public land mobile network (PLMN) of a 3rd Generation Partnership Project (3GPP) access and a PLMN of a non-3GPP interworking function (N3IWF) are the same, when a terminal is connected through a 3GPP access and a non-3GPP access, according to an embodiment of the present disclosure.

FIG. 11 illustrates a cellular network structure using a common AMF, wherein a PLMN of a 3GPP access and a PLMN of an N3IWF are the same, when a terminal is connected through a 3GPP access and a non-3GPP access, according to an embodiment of the present disclosure.

Referring to FIG. 11, when a terminal (or UE) 1101 accesses a 5G core network through 3GPP access, i.e., a 5G RAN 1102, and accesses the 5G core network through a non-3GPP access 1103, a same common AMF 1105 is selected when an N3IWF 1104 that the terminal 1101 selects is in the same PLMN as the 3GPP access. The case as to how to select the common AMP will be described later.

Here, the N3IWF 1104 is 5G core network equipment that defines a smooth interworking of the non-3GPP access 1103 with the 5G core network and is an entity that forwards a NAS message or data transmitted/received through the non-3GPP access 1103 (and may be referred to as ngPDG).

Figure 12:
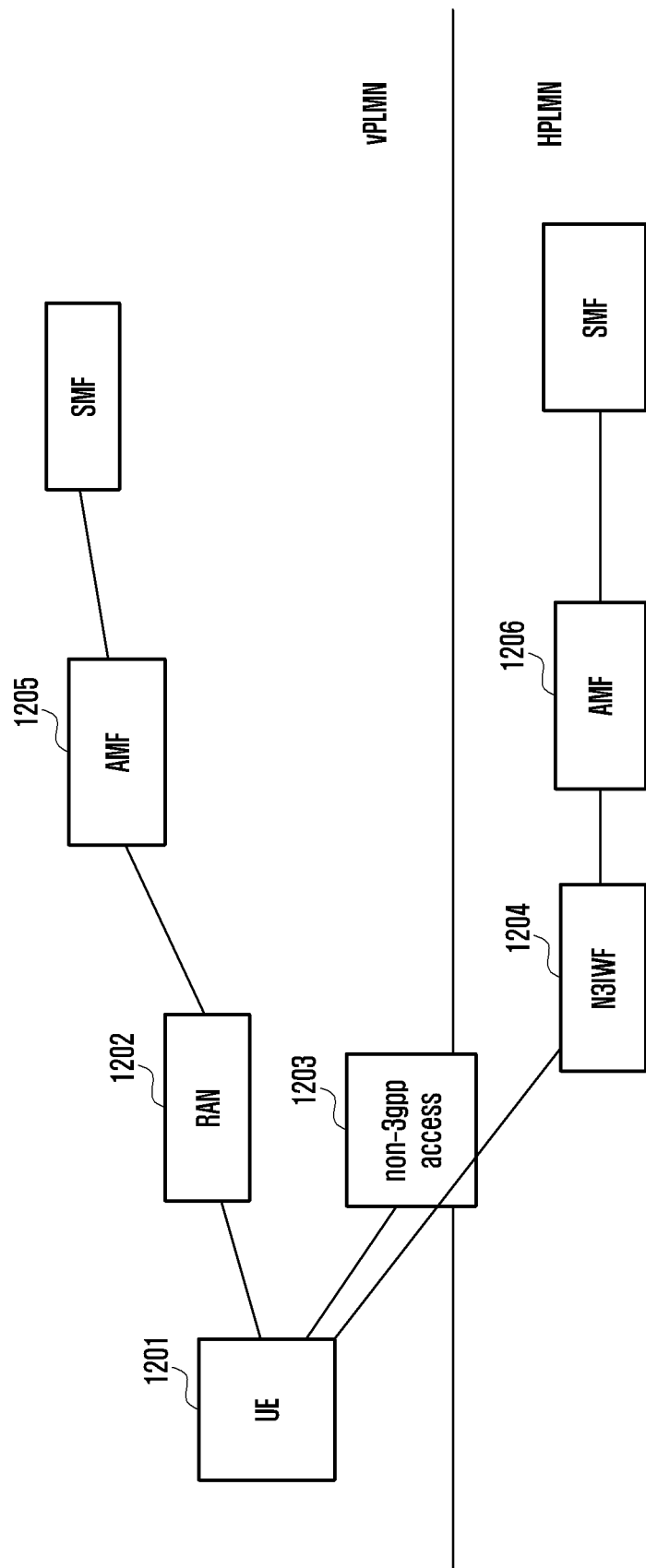
FIG. 12 illustrates a cellular network structure using different AMFs, wherein a PLMN of a 3GPP access and a PLMN of N3IWF are different, when a terminal is connected through a 3GPP access and a non-3GPP access, according to an embodiment of the present disclosure.

FIG. 12 illustrates a cellular network structure using different AMFs, wherein a PLMN of a 3GPP access and a PLMN of N3IWF are different, when a terminal is connected through a 3GPP access and a non-3GPP access, according to an embodiment of the present disclosure.

Referring to FIG. 12, when a terminal (or UE) 1201 accesses the 5G core network through the 3GPP access, i.e., a 5G RAN 1202, and accesses the 5G core network through a non-3GPP access 1203, different AMFs 1205 and 1206 are selected when an N3IWF 1204 that the terminal 1201 selects is in the PLMN different from the 3GPP access, i.e., the RAN 1202. The case as to how to select the common AMP will be described later.

Figure 13:
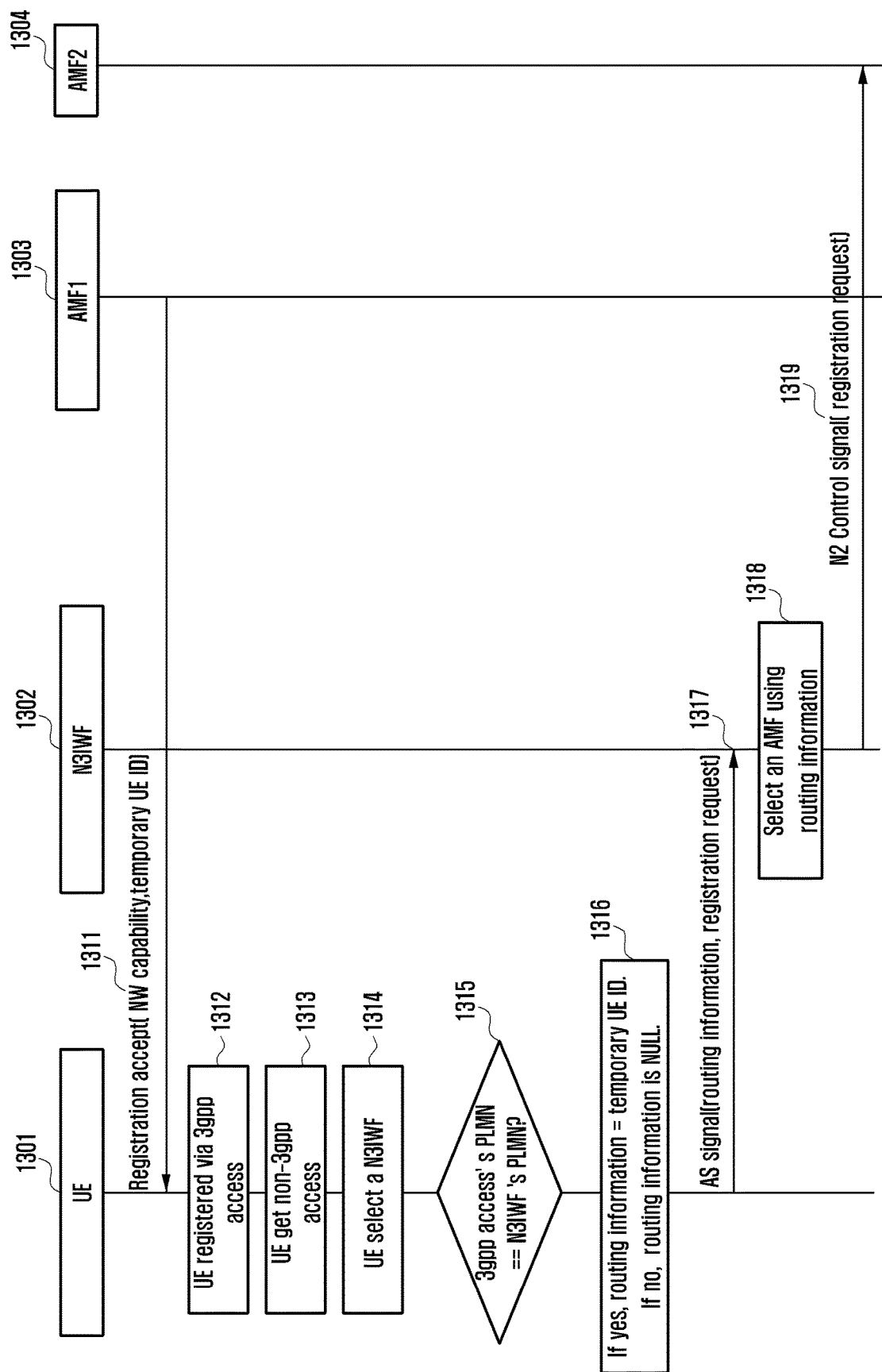
FIG. 13 is a signal flow diagram illustrating a method of selecting an AMF, when a terminal connected to a 3GPP access accesses a 5G network through a non-3GPP access, according to an embodiment of the present disclosure.

FIG. 13 illustrates a process of selecting an AMF when a terminal connected to a 3gpp access according to an embodiment of the present disclosure accesses a 5G network through a non-3gpp access.

Referring to FIG. 13, when a UE 1301 is successfully registered in the 5G network, a temporary UE ID for the UE 1301 is allocated from a serving AMF 1303 in step 1311. The temporary UE ID may include information of a PLMN that the UE 1301 accesses or a temporary value at which the AMF 1303 is allocated from the UE 1301 together with an ID of an AMP group to which the serving AMF 1303 belongs or a part or all of the IDs of the serving AMF 1303. The temporary UE ID is an ID corresponding to a globally unique temporary identity (GUTI) in an LTE system. The UE 1301 may include the network capability in the connected AMF 1303 together with the temporary UE ID. The network capability may also include information on a service type that may be provided by the AMF 1303.

When the UE 1301 registered in the 5G network through the 3GPP access discovers the non-3GPP access, such as the WiFi, in step 1313, the UE 1301 discovers and selects an N3IWF 1302, when accessing the 5G network through the non-3GPP access, in step 1314. A similar method as selecting, by a UE, an ePDG in an LTE system (refer to TS 23.402) may be used for discovering and selecting the N3IWF 1302.

In step 1315, the PLMN selected in the 3GPP access is compared with the PLMN to which the selected N3IWF belongs. If the PLMNs are equal to each other, the UE 1301 sets routing information, which is information for the N3IWF 1302 to select an AMF, as the temporary UE ID or a part of the temporary UE ID allocated in the previous 3GPP registration step. For example, a part of the temporary UE ID may include a PLMN ID, an ID of an AMF group to which the serving AMF 1303 belongs, or a part or all of the IDs of the serving AMFs.

However, if the PLMN selected in the 3GPP access is different from the PLMN to which the selected N3IWF belongs, no value is set as the routing information or a null value is set in step 1316.

The UE 1301 transmits the routing information generated in step 1316 to the N3IWF 1302 together with the registration request message for attaching in step 1317, and the N3IWF 1302 selects the AMF 1304 using the received routing information in step 1318. The registration request message may include the temporary UE ID received through the 3GPP access, and may also include an indication to indicate that the temporary UE ID is allocated from the AMF currently accessed through the 3GPP access or that there is already registration via another access.

When the ID of the serving AMF 1303 is included in the routing information, the N3IWF 1302 selects the serving AMF 1303, when selecting the AMF for the non-3GPP access.

However, when the routing information includes the ID of the AMF group to which the serving AMF 1303 belongs without the ID of the serving AMF 1303, if an AMF 1304 different from the serving AMF 1303 is selected by selecting the AMF for the non-3GPP access, the selected AMF finds the ID of the serving AMF 1303 by referring to the temporary UE ID included in the registration request message of the UE and then redirects the registration request message to the serving AMF 1303 to select the same common AMF.

If the routing information does not include information enough to find the ID of the serving AMF 1303, a default AMF may be selected. The default AMF finds the ID of the serving AMF 1303 by referring to the temporary UE ID included in the registration request message of the UE as needed, and then redirects the registration request message to the serving AMF 1303 to select the same common AMF.

Thereafter, the registration process is performed through the non-3GPP access of the UE through the selected AMF.

Figure 14:
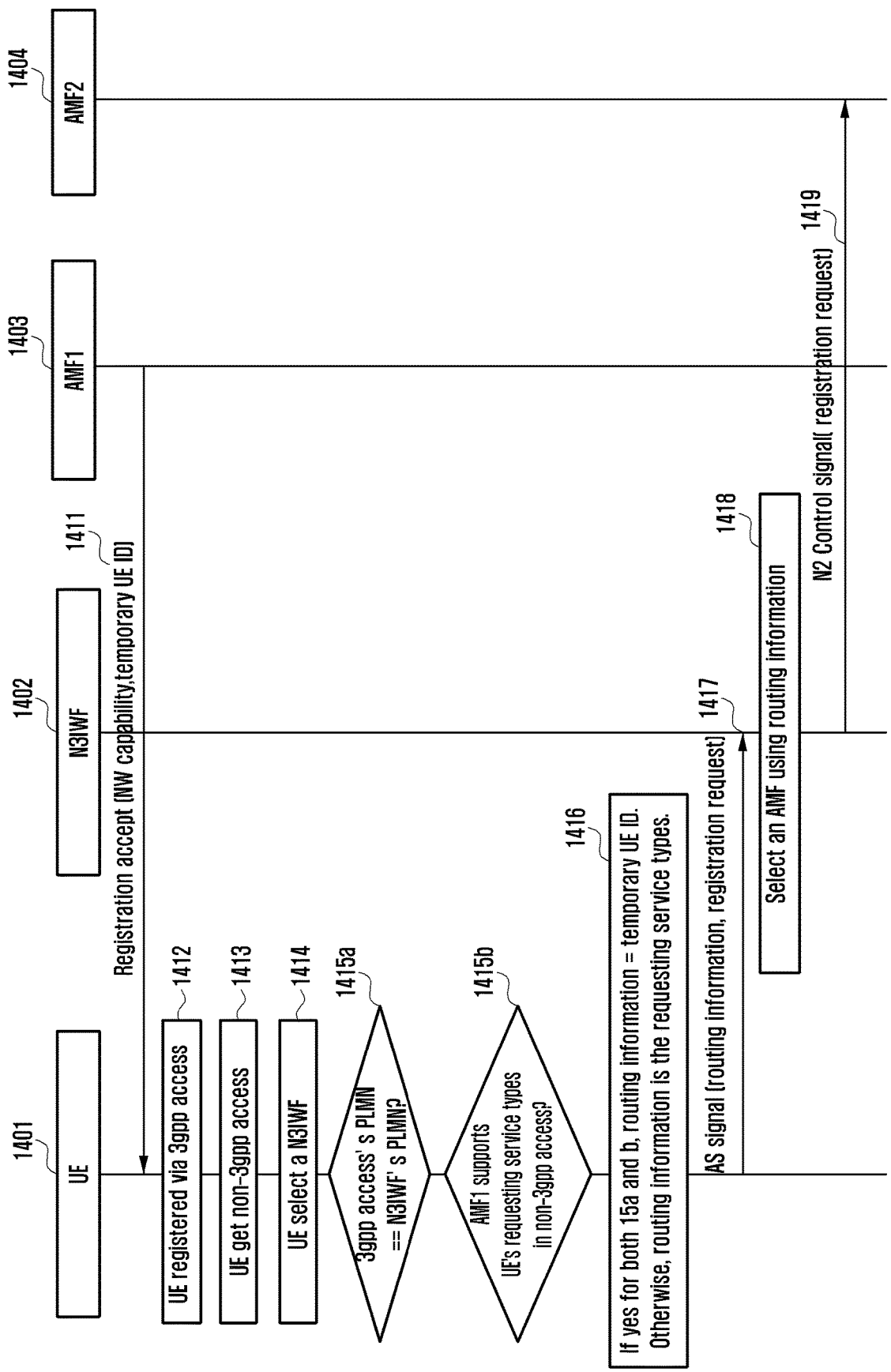
FIG. 14 is a signal flow diagram illustrating a method of selecting an AMF, when a terminal connected to a 3GPP access accesses a 5G network through a non-3GPP access, according to an embodiment of the present disclosure.

FIG. 14 illustrates a process of selecting an AMF when a terminal connected to a 3gpp access according to another embodiment of the present disclosure accesses a 5G network through a non-3gpp access.

Referring to FIG. 14, when a UE 1401 is successfully registered in the 5G network, a temporary UE ID for the UE is allocated from a serving AMF 1403 in step 1411. The temporary UE ID includes the information of the PLMN that the UE 1401 accesses and the AMF 1403 includes a temporary value that the UE 1401 allocates together with an ID of an AMF group to which the serving AMF 1403 belongs or a part or all of the IDs of the serving AMF 1403. The temporary UE ID is an ID corresponding to a GUTI in an LTE system. The UE 1401 may include the network capability in the connected AMF 1403 together with the temporary UE ID. The network capability may also include information on a service type that may be provided by the AMF 1403.

When the UE 1401 registered in the 5G network through the 3GPP access discovers the non-3GPP access, such WiFi, in step 1413, the UE 1402 discovers and selects an N3IWF 1402 when accessing the 5G network through the non-3GPP access, in step 1414. A similar method as selecting, by a UE, an ePDG in an LTE system (refer to TS 23. 402) may be used for discovering and selecting, by the terminal 1401, the N3IWF 1402.

The PLMN selected in the 3GPP access is compared with the PLMN to which the selected N3IWF belongs in step 1415a. In addition, the UE 1401 determines whether the serving AMF 1403 supports the service type requested by the UE 1401 through the non-3GPP access based on the network capability information received in step 1411 in step 1415b.

If the PLMNs are equal to each other and the serving AMF 1403 supports a service type requested by the UE 1401 through the non-3GPP access, the UE 1401 sets the routing information, which is the information for the N3IWF 1402 to select the AMF, as a part of the temporary UE ID or the temporary UE ID allocated in the previous 3GPP registration step. For example, a part of the temporary UE ID may include a PLMN ID, an ID of an AMF group to which the serving AMF 1403 belongs, or a part or all of the IDs of the serving AMFs.

However, if the PLMN selected in the 3GPP access is different from the PLMN to which the selected N3IWF 1402 belongs or the serving AMF 1403 does not support the service type requested by the UE 1401 through the non-3GPP access, the service type to be requested through the non-3GPP access is set as the routing information in step 1416.

The UE 1401 transmits the routing information generated in step 1416 to the N3IWF 1402 together with the registration request message for attaching in step 1417, and the N3IWF 1402 selects the AMF 1404 using the received routing information in step 1418. The registration request message may include the temporary UE ID received through the 3GPP access, and may also include an indication to indicate that the temporary UE ID is allocated from the AMF currently accessed through the 3GPP access or that there is already registration via another access.

When the ID of the serving AMF 1403 is included in the routing information, the N3IWF 1402 selects the serving AMF 1403 when selecting an AMF for the non-3GPP access.

However, when the routing information includes the ID of the AMF group to which the serving AMF 1403 belongs without the ID of the serving AMF 1403, if an AMF 1404 different from the serving AMF 1403 is selected by selecting the AMF for the non-3gpp access, the selected AMF finds the ID of the serving AMF 1403 by referring to the temporary UE ID included in the registration request message of the UE 1401 and then redirects the registration request message to the serving AMF 1403 to select the same common AMF.

When the service type to be requested through the non-3gpp access is included in the routing information, it is possible to select an appropriate AMF that may serve the service type separately from the serving AMF 1403 of the 3gpp access.

Thereafter, the registration process is performed through the non-3gpp access of the UE 140 through the selected AMF.

Figure 15:
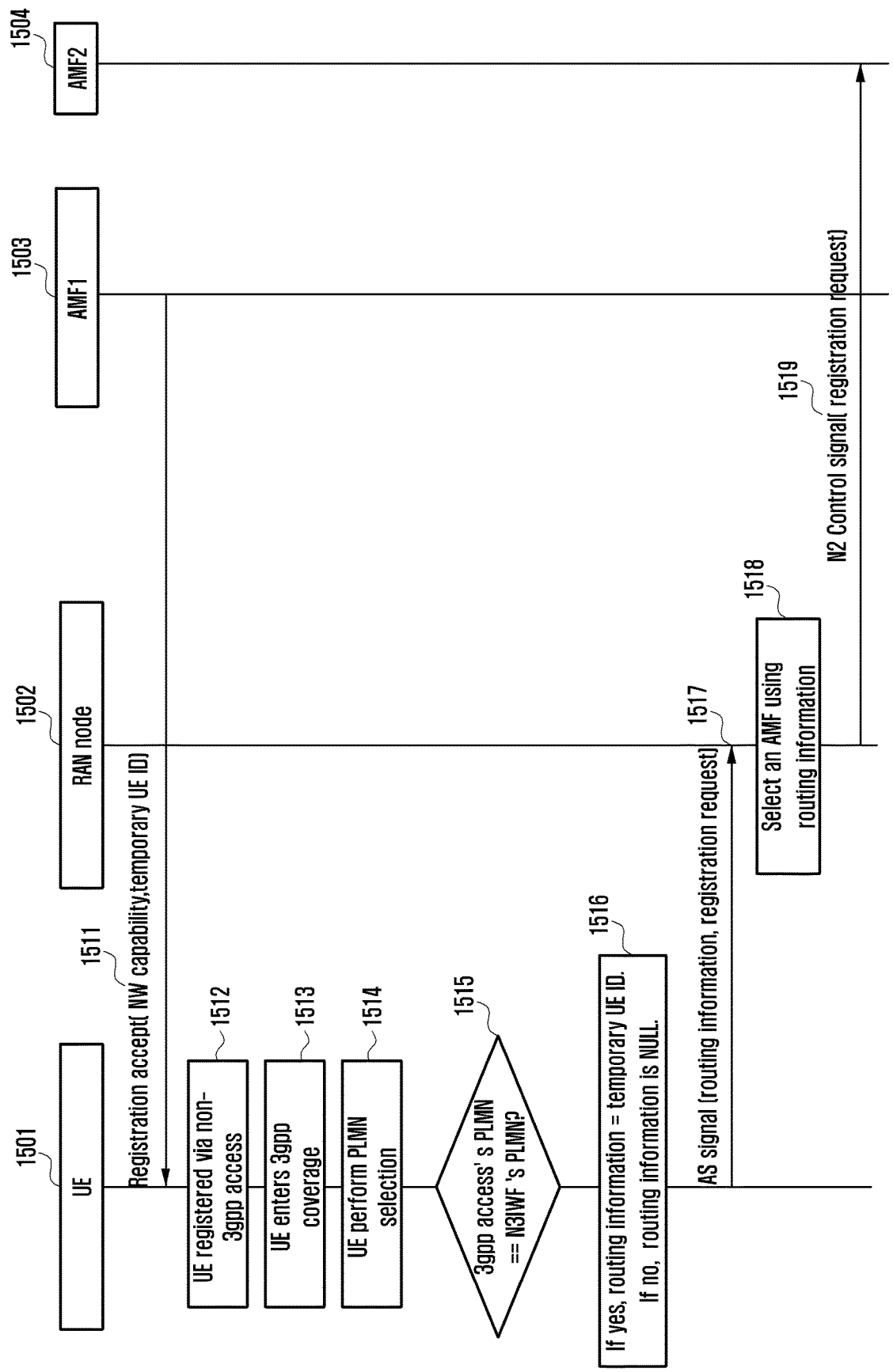
FIG. 15 is a signal flow diagram illustrating a method of selecting an AMF, when a terminal connected to a non-3GPP access accesses a 5G network through a 3GPP access, according to an embodiment of the present disclosure.

FIG. 15 illustrates a process of selecting an AMF when a terminal connected to a non-3gpp access according to another embodiment of the present disclosure accesses a 5G network through a 3gpp access Referring to FIG. 15, when a UE 1501 is successfully registered in the 5G network through a non-3GPP access, a temporary UE ID for the UE 1501 is allocated from a serving AMF 1503 in step 1511. The temporary UE ID includes the information of a PLMN that the UE 1501 accesses or a temporary value at which the AMF 1503 is allocated from the UE 1501 together with an ID of an AMP group to which the serving AMF 1503 belongs or a part or all of the IDs of the serving AMF 1503. The temporary UE ID is an ID corresponding to a GUTI in an LTE system. The UE 1501 may include the network capability in the connected AMF together with the temporary UE ID. The network capability may also include information on a service type that may be provided by the AMF 1503.

The terminal 1501 registered in the 5G network through the non-3GPP access enters 3GPP coverage in step 1513, and performs PLMN selection to access the 5G network through the 3GPP access in step 1514.

In step 1515, the PLMN of the N3IWF selected by the non-3GPP access and the PLMN selected for the 3GPP access are compared with each other. If the PLMNs are the same, the UE 1501 sets routing information, which is information for the RAN 1502 to select the AMF, as the temporary UE ID or a part of the temporary UE ID allocated in the previous non-3GPP registration step. For example, a part of the temporary UE ID may include a PLMN ID, an ID of an AMF group to which the serving AMF 1503 belongs, or a part or all of the IDs of the serving AMFs.

However, if the PLMN selected in the 3GPP access is different from the PLMN to which the N3IWF for the non-3GPP access belongs, no value is set as the routing information or a null value is set in step 1516.

The UE 1501 transmits the routing information generated in step 1516 to the RAN 1502 together with the registration request message for attaching in step 1517, and the RAN 1502 selects the AMF 1504 using the received routing information step 1518. The registration request message may include the temporary UE ID received through the non-3GPP access, and may also include an indication to indicate that the temporary UE ID is allocated from the AMF currently accessed through the non-3GPP access or that there is already registration via another access.

When the ID of the serving AMF 1503 is included in the routing information, the RAN 1502 selects the serving AMF 1503 when selecting the AMF for the 3GPP access.

However, when the routing information includes the ID of the AMF group to which the serving AMF 1503 belongs without the ID of the serving AMF 1503, if an AMF 1504 different from the serving AMF is selected for the 3GPP access, the selected AMF 1504 finds the ID of the serving AMF 1503 by referring to the temporary UE ID included in the registration request message of the UE and then redirects the registration request message to the serving AMF 1503 to select the same common AMF.

If the routing information does not include information enough to find the ID of the serving AMF 1503, a default AMF may be selected. The default AMF finds the ID of the serving AMF 1503 by referring to the temporary UE ID included in the registration request message of the UE as needed, and then redirects the registration request message to the serving AMF 1503 to select the same common AMF.

Thereafter, the registration process is performed through the 3GPP access of the UE through the selected AMF.

Figure 16:
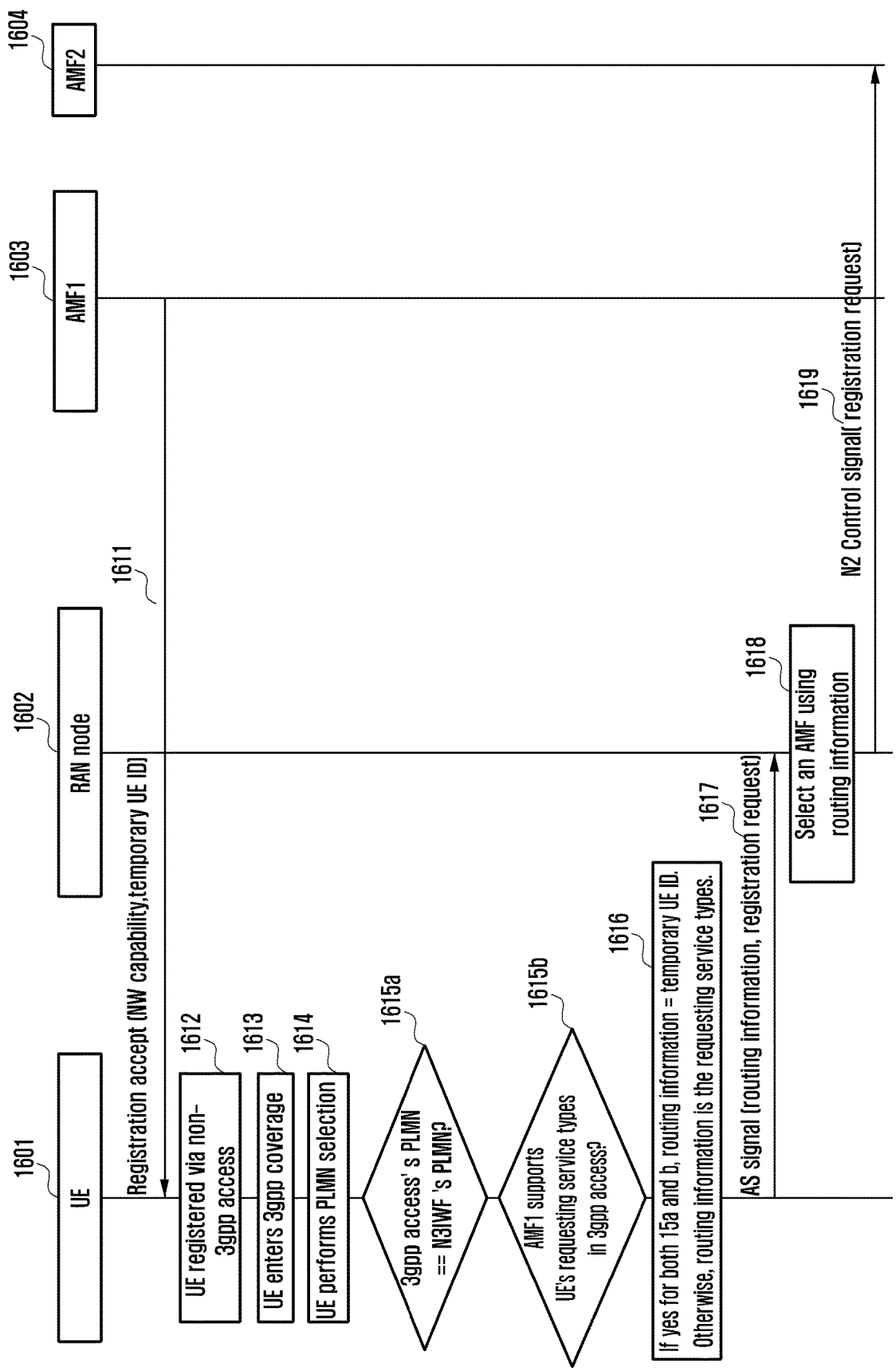
FIG. 16 is a signal flow diagram illustrating a method of selecting an AMF, when a terminal connected to a non-3GPP access accesses a 5G network through a 3GPP access, according to an embodiment of the present disclosure.

FIG. 16 illustrates a process of selecting an AMF when a terminal connected to a non-3gpp access according to another embodiment of the present disclosure accesses a 5G network through a 3gpp access Referring to FIG. 16, when a UE 1601 is successfully registered in the 5G network through a non-3GPP access, a temporary UE ID for the UE 1601 is allocated from a serving AMF 1603 in step 1611. The temporary UE ID includes the information of the PLMN that the UE 1601 accesses or a temporary value at which the AMF 1603 is allocated from the UE 1601 together with an ID of an AMF group to which the serving AMF 1603 belongs or a part or all of the IDs of the serving AMF 1603. The temporary UE ID is an ID corresponding to a GUTI in an LTE system. The UE 1601 may include the network capability in the connected AMF 1603 together with the temporary UE ID. The network capability may also include information on a service type that may be provided by the AMF 1603.

The terminal 1601 registered in the 5G network through the non-3GPP access enters a 3GPP coverage in step 1613, and performs PLMN selection to access the 5G network through the 3GPP access in step 1614.

In step 1615*a*, the PLMN of the N3IWF selected by the non-3GPP access and the PLMN selected for the 3GPP access are compared with each other.

In addition, in step 1615*b*, the UE 1601 determines whether the serving AMF 1603 supports the service type requested by the UE 1601 through the 3GPP access based on the network capability information received in step 1611.

If the PLMNs are the same and the serving AMF 1603 supports a service type requested by the UE 1601 through the 3GPP access, the UE 1601 sets the routing information, which is the information for the RAN 1602 to select the AMF, as a part of the temporary UE ID or the temporary UE ID allocated in the previous non-3GPP registration step in step 1616. For example, a part of the temporary UE ID may include a PLMN ID, an ID of an AMF group to which the serving AMF 1603 belongs, or a part or all of the IDs of the serving AMFs.

However, if the PLMN selected by the 3GPP access is different from the PLMN belonging to the N3IWF selected for the non-3GPP access or the serving AMF 1603 does not support the service type that the terminal 1601 requests through the 3GPP access, the service type to be requested through the 3GPP access is set as the routing information in step 1616.

The UE 1601 transmits the routing information generated in step 1616 to the RAN 1602 together with the registration request message for attaching in step 1617, and the RAN 1602 selects the AMF 1604 using the received routing information in step 1618. The registration request message may include the temporary UE ID received through the non-3GPP access, and may also include an indication to indicate that the temporary UE ID is allocated from the AMF currently accessed through the non-3GPP access or that there is already registration via another access.

When the ID of the serving AMF 1603 is included in the routing information, the RAN 1602 selects the serving AMF 1603 when selecting the AMF for the 3GPP access.

However, when the routing information includes the ID of the AMF group to which the serving AMF 1603 belongs without the ID of the serving AMF 1603, if an AMF 1604 different from the serving AMF 1603 is selected for the 3GPP access, the selected AMF 1604 finds the ID of the serving AMF 1603 by referring to the temporary UE ID included in the registration request message of the UE 1601 and then redirects the registration request message to the serving AMF 1603 to select the same common AMF.

When the service type to be requested through the 3GPP access is included in the routing information, it is possible to select an appropriate AMF that may serve the service type separately from the serving AMF of the non-3GPP access.

Thereafter, the registration process is performed through the 3GPP access of the UE through the selected AMF.

Third Embodiment

In describing in detail a third embodiment, terms identifying an access node, terms indicating network entity, terms indicating messages, terms indicating an interface between network entities, terms indicating various types of identification information, and so on that are used in the following description are exemplified for convenience of explanation. Accordingly, the present disclosure is not limited to terms to be described below and other terms indicating objects having the equivalent technical meaning may be used.

For convenience of explanation, the present disclosure uses terms and names defined in the specification for the 5G system. However, the present disclosure is not limited to the terms and names but may also be identically applied to the system according to other standards.

Figure 17:
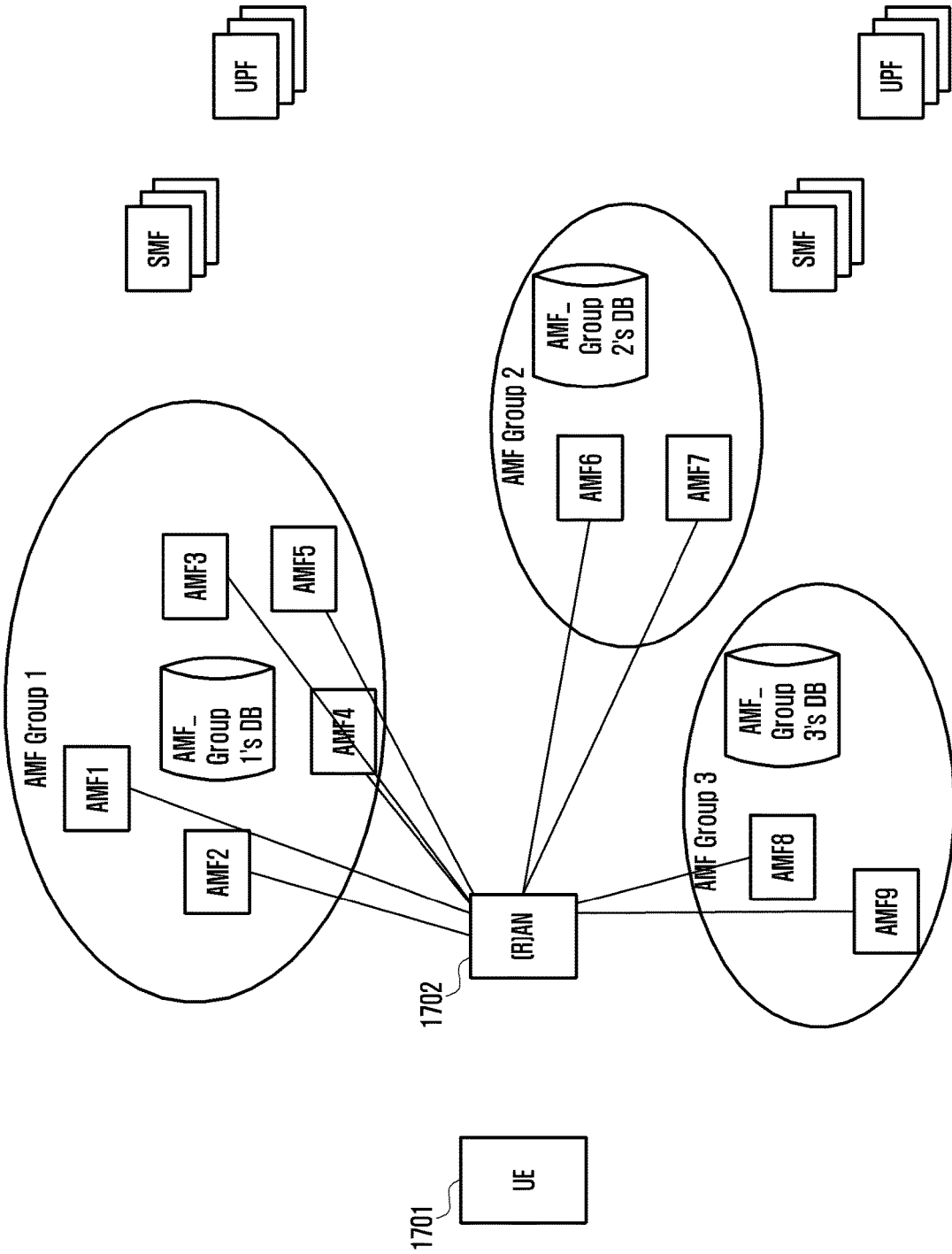
FIG. 17 illustrates a network structure between a RAN node and AMFs, according to an embodiment of the present disclosure.

FIG. 17 illustrates a network structure between a (R)AN node and AMFs, according to an embodiment of the present disclosure. Here, when the (R)AN node corresponds to the RAN node, that is, the base station in the case of the 3gpp access and corresponds to the N3IWF in the case of the non-3gpp access.

Specifically, FIG. 17 illustrates a method for selecting, by a RAN node, an AMF suitable to forward an initial NAS message when a terminal accesses the 5G network to transmit an initial NAS message such as a registration request message. In addition, FIG. 17 illustrates a network configuration method for eliminating stickiness or persistence between the terminal and the AMF in the process of selecting the AMF.

Referring to FIG. 17, AMFs 1 to 9 generate AMF groups 1 to 3 according to the kind of service types they each may service, and each AMF group includes an AMF group database (DB) storing information of UE context, such as UE status, in which all AMFs belonging to the AMF group are processed. The (R)AN node 1702 has a preconfigured connection with the AMFs of each AMF group (e.g., a similar concept as an S1-mobility management entity (MME) connection of an evolved packet core (EPC) network). The AMFs in the AMF group all have connections with the same (R)AN nodes 1702.

Each AMF records the context of the UE 1701 added, updated, or deleted in the database of the AMF group, including the status of the UE 1701.

In setting up a packet data unit (PDU) session, an AMF selects an appropriate SMF, and the SMF selects an appropriate UPF to create a tunnel between the (R)AN node 1702 and the UPF for transmitting data.

Figure 18:
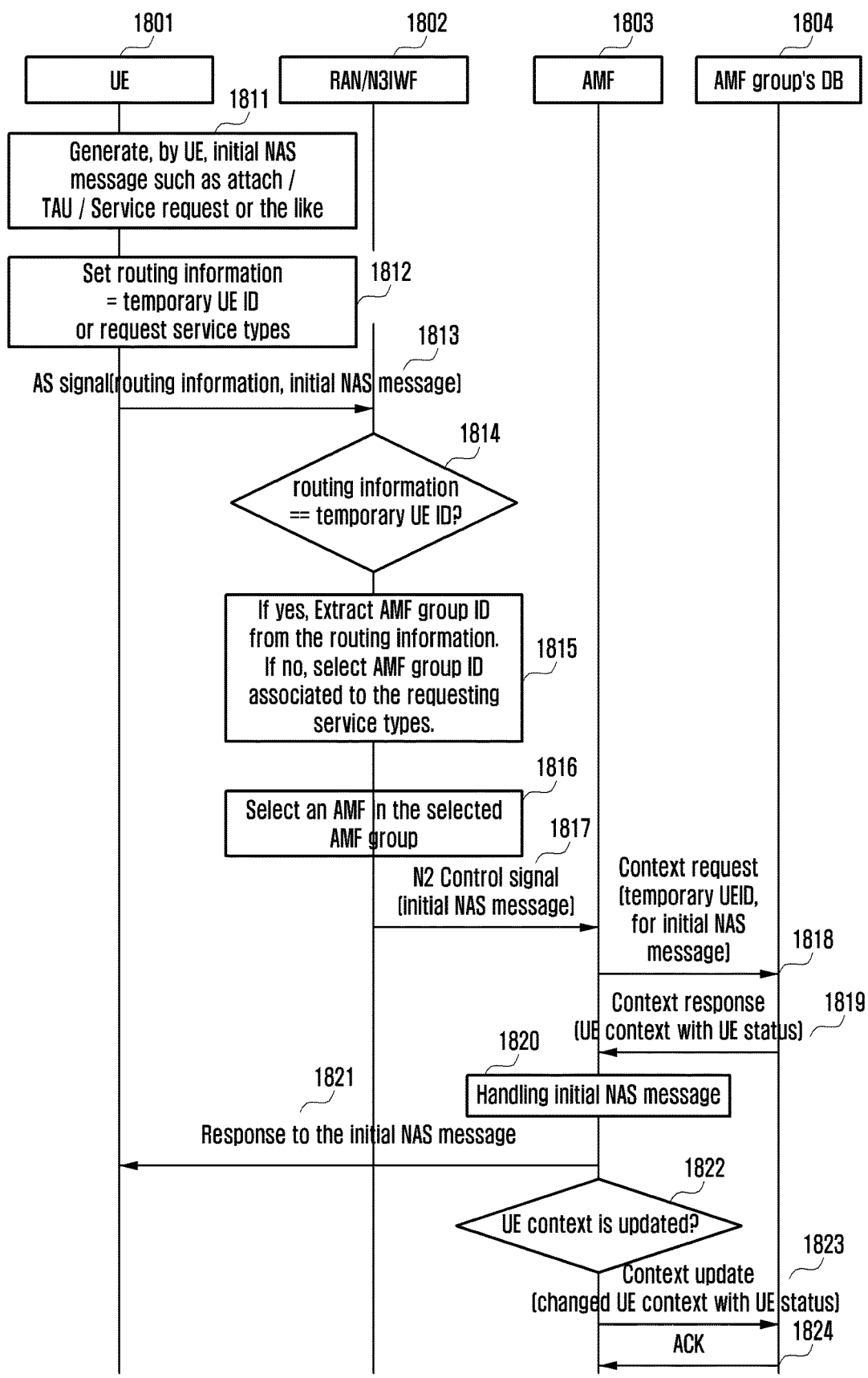
FIG. 18 is a signal flow diagram illustrating a method of selecting, by a RAN node, an appropriate AMF, when a terminal transmits an initial NAS message, according to an embodiment of the present disclosure.

FIG. 18 illustrates a process of selecting, by a (R)AN node, an appropriate AMF when a terminal transmits an initial NAS message according to an embodiment of the present disclosure.

Referring to FIG. 18, a terminal 1801 generates an initial NAS message to access the 5G core network in step 1811. The initial NAS message corresponds to, e.g., an attach request message, a tracking area update (TAU) request message, a registration request message, a service request message for registration, etc. The terminal 1801 may include the routing information so that the RAN node 1802 may transmit the generated initial NAS message to an appropriate AMF.

In step 1812, when the UE 1801 is already registered in the current area (e.g., a tracking area identifier (TAI) list), all of the temporary UE IDs or a part of the temporary UE ID that the AMF allocates, e.g., a part or all of the PLMN ID or the AMF group ID or the AMF ID is used as the routing information. If the terminal 1801 is not already registered in the current area (e.g., TAI list), the terminal 1801 may set the service types that the terminal 1801 wants as the routing information as routing information.

The terminal 1801 transmits the initial NAS message together with the routing information to the (R)AN node 1802 in step 1813. The (R)AN node 1802 is a RAN (or a base station) in the 3GPP access, or an N3IWF in the non-3GPP access.

The (R)AN node 1802 determines whether the received routing information is the temporary UE ID or a part of a temporary UE ID in step 1814. If yes, the (R)AN node 1802 extracts an AMF group ID from the corresponding routing information. However, if not, the terminal 1801 obtains the AMF group ID by selecting the associated AMF group for the requesting service types that the terminal 1801 requests. If there is no AMF group supporting all the requesting service types, the AMF group supporting some service types may be selected as a lane or the default AMF group may be selected in step 1815. The RAN node 1802 selects the appropriate AMF by referring to location information of the UE 1801, load information between the AMFs among the AMFs of the selected AMF group in step 1816, and transmits the initial NAS message to the selected AMF in step 1817. If the initial UE message includes the temporary UE ID, the AMF 1803 requests and receives the context of the corresponding UE from the AMF group database 1804. In step 1818, the UE context request message may transmit the temporary UE ID together with information as to what purpose it is. In step 1819, the AMF group database 1804 transmits the context information of the UE including the status of the UE 1801 to the AMF 1803. The context information of the UE may include information for UE authentication.

Based on the received UE context, the AMF 1803 processes the initial NAS message in step 1820, and if necessary, the processing result may be transmitted to the terminal 1801 in step 1821. In steps 1822, 1823, and 1824, if the UE context and UE status are changed in the process of the initial NAS message, the updated information is informed to the AMF group database 1804.

Figure 19:
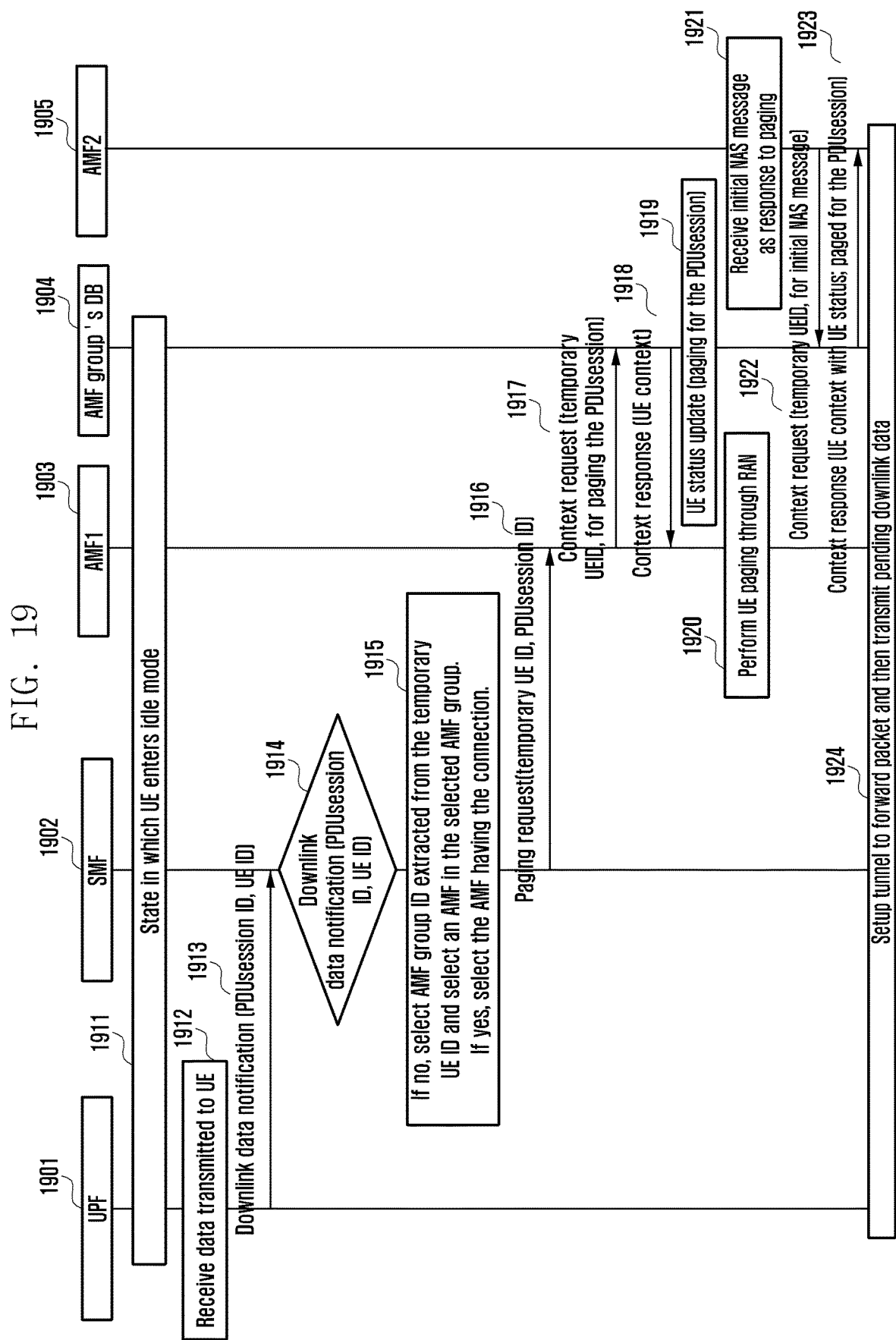
FIG. 19 is a signal flow diagram illustrating a method of selecting, by a session management function (SMF), an AMF to transmit paging to a terminal in an IDLE mode, according to an embodiment of the present disclosure.

FIG. 19 illustrates a process of selecting, by an SMF, an AMF to transmit paging to a terminal in an IDLE mode according to an embodiment of the present disclosure.

Referring to FIG. 19, when downlink data reaches a UPF 1901 in step 1912, while a UE is successfully registered in the 5G network and then enters the idle mode in step 1911, the UPF 1901 transmits a downlink data notification message to an SMF 1902 to inform the UE that data are reached in step 1913. The downlink data notification may include some or all of the PDU session ID or the UE ID. The UE ID may use a pre-allocated temporary UE ID or a permanent ID of the UE, e.g., IMSI information.

In step 1914, the SMF 1902 receiving the downlink data notification confirms that there is the connection with the AMF for the corresponding terminal. If there is no connection, the AMF group ID is selected from the temporary UE ID of the UE that the SMF 1902 and one AMF is selected from the AMFs belonging to the selected AMF group ID in step 1915. However, if there is a connection, the AMF that has the connection is selected.

In step 1916, the SMF 1902 transmits a paging request message to the selected AMF1 1903 to inform the corresponding terminal that downlink data has been generated. The paging request message may include a PDU session ID that the downlink data reaches and the temporary UE ID.

The AMF1 1903, after receiving the paging request message, requests and receives the UE context corresponding to the temporary UE ID to the AMF group database 1904 in steps 1917 and 1918. The AMF1 1903 informs the UE context request message together with the PDU session ID that it is for paging for the PDU session and the temporary UE ID, so that the AMF group database 1904 may update the UE status together with the UE context in steps 1917 and 1919.

The AMF1 1903 receiving the UE context performs UE paging through the RAN in step 1920. The UE receiving the UE paging transmits the initial NAS message through the method provided in FIG. 18, and the appropriate AMF2 1905 receives the initial NAS message in step 1921, and requests and receives the UE context to the AMF group database 1904 using the temporary UE ID included in the initial NAS message. The AMF2 1905 recognizes from the AMF group database 1904 that the paging for the UE status, i.e., the PDU session is in progress with the UE context, and sets up a tunnel for transmitting the pending downlink data for the corresponding PDU session to forward data in step 1924. The AMF informs the AMF group database of the UE status change to end the paging and update the UE context that the switching to the connected mode is made.

Figure 20:
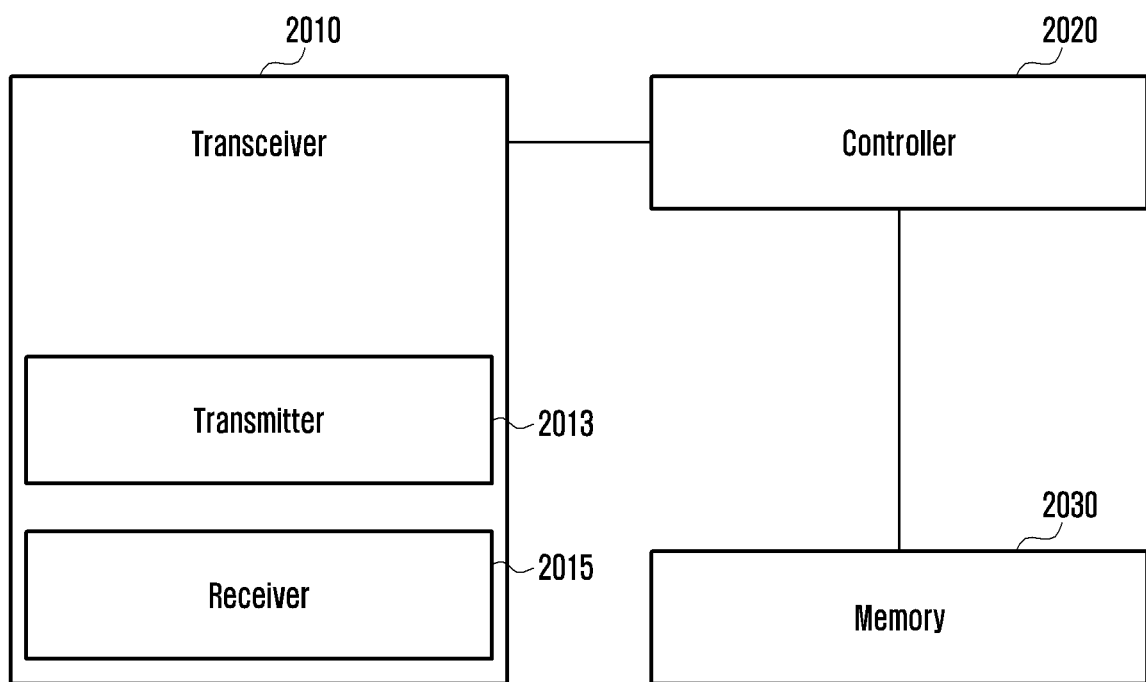
FIG. 20 illustrates a terminal according to an embodiment of the present disclosure.

FIG. 20 illustrates a terminal according to an embodiment of the present disclosure.

Referring to FIG. 20, the terminal includes a transceiver 2010 and a controller 2020 controlling the overall operation of the terminal. The transceiver 2010 includes a transmitter 2013 and a receiver 2015.

The transceiver 2010 may transmit and receive signals to and from other network entities via the transmitter 2013 and the receiver 2015, respectively.

The controller 2020 may control the terminal to perform any one operation of the above-described embodiments. For example, the controller 2020 is configured to transmit, to a first base station, a first message comprising at least one of first information for identifying an AMF, and second information of a service type requested by the terminal, and receive, from an AMF, a second message in response to the first message.

The controller 2020 and the transceiver 2010 are not necessarily implemented as a separate module but may be implemented as one component in a single chip. Further, the controller 2020 and the transceiver 2010 may be electrically connected to each other. For example, the controller 2020 may be a circuit, an application-specific circuit, or at least one processor. In addition, the operations of the terminal may be realized by including a memory device storing the corresponding program code in any component of the terminal.

The terminal also includes a memory 2030, which may store at least one of the information transmitted/received through the transceiver 2010 and the information generated through the controller 2010.

Figure 21:
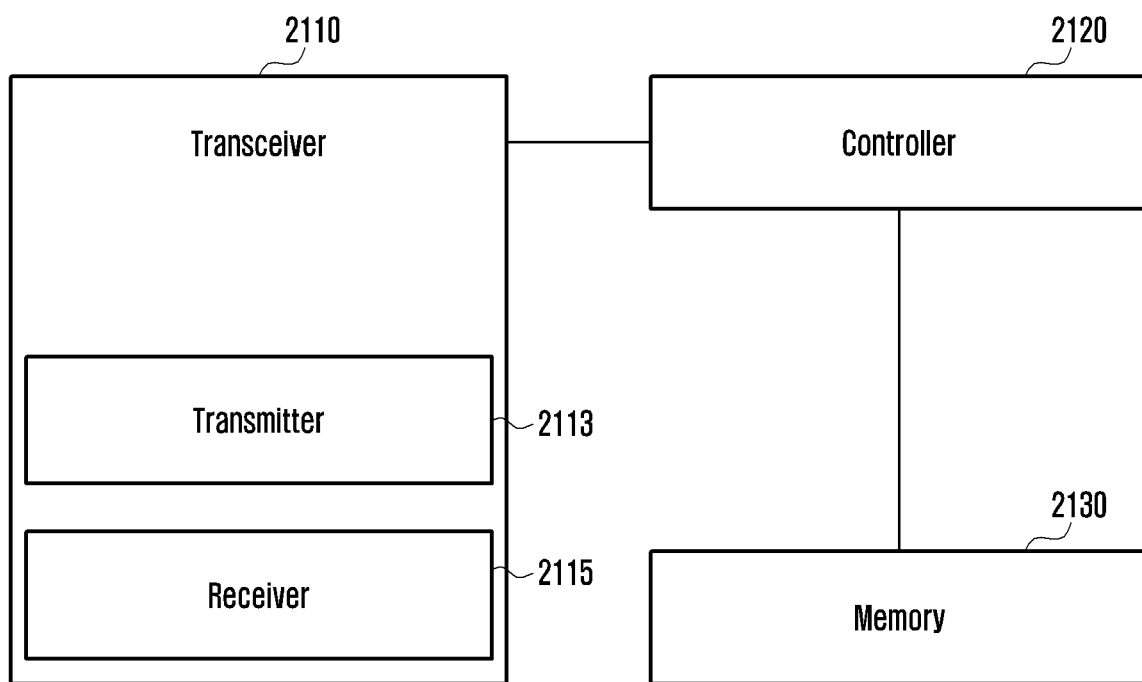
FIG. 21 illustrates a base station according to an embodiment of the present disclosure.

FIG. 21 illustrates a base station according to an embodiment of the present disclosure.

Referring to FIG. 21, the base station includes a transceiver 2110 and a controller 2120 controlling the overall operation of the base station. The transceiver 2110 includes a transmitter 2113 and a receiver 2115.

The transceiver 2110 may transmit and receive signals to and from other network entities via the transmitter 2113 and the receiver 2115, respectively.

The controller 2120 may control the base station to perform any one operation of the above-described embodiments. For example, the controller 2120 is configured to receive, from a terminal, a message comprising at least one of first information for identifying an AMF, and second information of a service type requested by the terminal, select an AMF set based on at least one of the first information and the second information, and select an AMF from the selected AMF set.

The controller 2120 and the transceiver 2110 are not necessarily implemented as a separate module but may be implemented as one component in a single chip.

The controller 2120 and the transceiver 2110 may be electrically connected to each other. For example, the controller 2120 may be a circuit, an application-specific circuit, or at least one processor. In addition, the operations of the base station may be realized by including a memory device storing the corresponding program code in any component of the terminal.

The base station also includes a memory 2130, which may store at least one of the information transmitted/received through the transceiver 2110 and the information generated through the controller 2120. For example, the memory 2130 may store at least one of the information transmitted/received through the transceiver 2110 and the information generated through the controller 2120.

Figure 22:
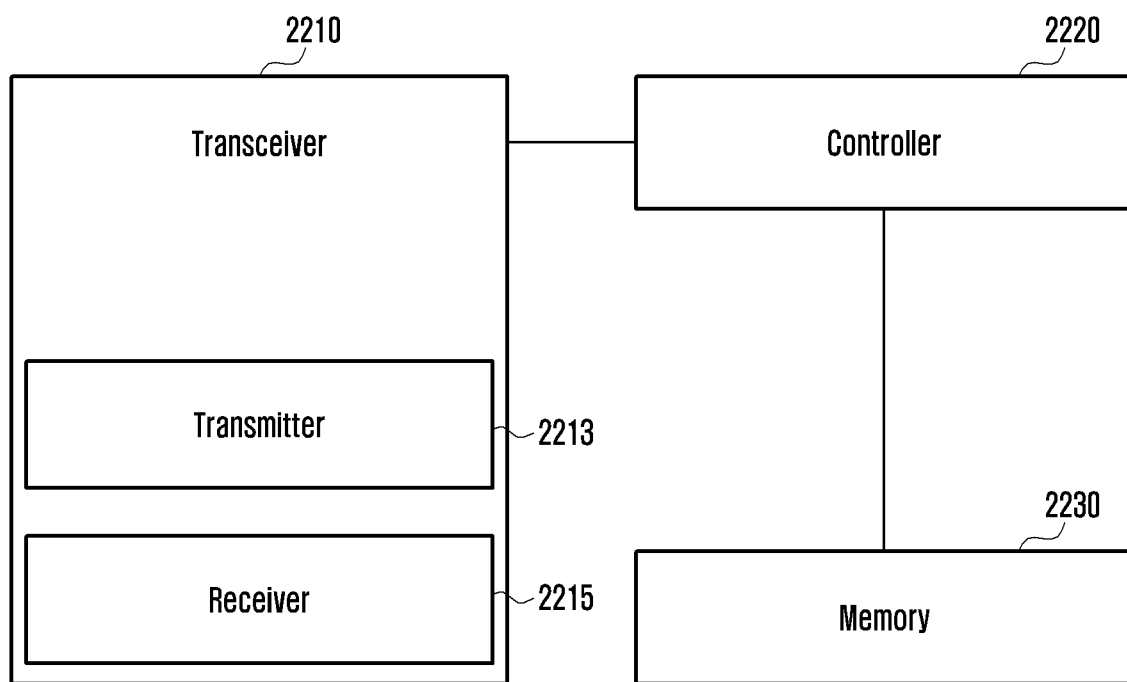
FIG. 22 illustrates an AMF according to an embodiment of the present disclosure.

FIG. 22 illustrates an AMF according to an embodiment of the present disclosure.

Referring to FIG. 22, the AMF includes a transceiver 2210 and a controller 2220 controlling the overall operation of the AMF. The transceiver 2210 includes a transmitter 2213 and a receiver 2215.

The transceiver 2210 may transmit and receive signals to and from other network entities via the transmitter 2213 and the receiver 2215, respectively.

The controller 2220 may control the AMF to perform any one operation of the above-described embodiments. For example, the controller 2220 is configured to determine to reroute a request message received from a terminal including information of a service requested by the terminal, select another AMF supporting the service request by the terminal, and transmits, to the selected another AMF, the request message.

The controller 2220 and the transceiver 2210 are not necessarily implemented as a separate module but may be implemented as one component in a single chip.

The controller 2220 and the transceiver 2210 may be electrically connected to each other. For example, the controller 2220 may be a circuit, an application-specific circuit, or at least one processor. In addition, the operations of the AMF may be realized by including a memory device storing the corresponding program code in any component of the AMF.

The AMF also includes a memory 2230, which may store at least one of the information transmitted/received through the transceiver 2210 and the information generated through the controller 2220. For example, the memory 2230 may store at least one of the information transmitted/received through the transceiver 2210 and the information generated through the controller 2210.

In the above-described embodiments of the present disclosure, components may be represented by a singular number or a plural number according to the detailed embodiment as described above. However, the expressions of the singular number or the plural number are selected to meet the situations proposed for convenience of explanation and the present disclosure is not limited to the single component or the plural components and even though the components are represented in plural, the component may be configured in a singular number or even though the components are represented in a singular number, the component may be configured in plural.

According to an embodiment of the present disclosure, a method for managing and using network deployment information in a wireless communication system is specified. In addition, the method for locating a network node providing a service that the UE wants based on the network deployment information is specified. Thus, the efficient service can be provided in the 5G mobile communication environment.

According to an embodiment of the present disclosure, the mobile communication service provider can provide a specific service to the terminal by allocating different mobility restriction areas to each network slice.

According to an embodiment of the present disclosure, the terminal can control the session connection by determining the network slice capable of transmitting/receiving data based on the mobility restriction area by establishing the session at the current location among the plurality of network slices used by the terminal.

According to an embodiment of the present disclosure, the 5G core network can be operated by determining the network slice capable of transmitting/receiving data based on the mobility restriction area by allowing the terminal to establish the session at the current location based on the operation according to the service request transmitted by the terminal.

According to an embodiment of the present disclosure, the terminal can select the same AMF or different AMF for the 3GPP and the non-3GPP access as needs to perform the routing of the NAS message and the data transmission through the efficient path.

According to an embodiment of the present disclosure, as the stickiness or persistence of the UE is removed in the course of selecting the AMF, it is possible to facilitate the network management such as the virtualization of the AMF related network and the reduction/expansion of the AMF equipment.

The embodiments of the present disclosure disclosed in the present specification and the accompanying drawings have been provided only as specific examples in order to assist in understanding the present disclosure and do not limit the scope of the present disclosure. That is, it is obvious to those skilled in the art to which the present disclosure pertains that other change examples based on the technical idea of the present disclosure may be made without departing from the scope of the present disclosure. Further, each embodiment may be combined and operated as needed. For example, some of the embodiments of the present disclosure may be combined with each other so that the base station and the terminal may be operated. In addition, although the above embodiments are presented based on the NR system, other modifications based on the technical idea of the embodiment may be applicable to other systems such as the FDD or TDD LTE system In addition, although the exemplary embodiments of the present disclosure have been illustrated in the present specification and the accompanying drawings and specific terms have been used, they are used in a general meaning in order to assist in the understanding the present disclosure and do not limit the scope of the present disclosure. It is obvious to those skilled in the art to which the present disclosure pertains that various modifications may be made without departing from the scope of the present disclosure, in addition to the exemplary embodiments disclosed herein.

What is claimed is:

1. A method performed by an access network entity in a wireless communication system, the method comprising:
receiving, from a terminal in the wireless communication system, a first message including first information for identifying an access and mobility management function (AMF) and a registration request message, the first information including an AMF set identifier and an AMF identifier;
selecting an AMF set based on the AMF set identifier;
selecting an AMF from the selected AMF set; and
transmitting, to the terminal, a second message as a response to the registration request message,
wherein the AMF set includes a plurality of AMFs based on network slices supported by each of the AMFs.

2. The method of claim 1, wherein the AMF is selected from the selected AMF set based on at least one of availability of at least one AMF included in the selected AMF set or load balancing across the at least one AMF included in the selected AMF set.

3. The method of claim 1, wherein the access network entity includes a radio access network entity or a non-3GPP inter-working function (N3IWF) entity.

4. The method of claim 1, wherein the first message further includes second information for a network slice selection assistance information (NSSAI) requested by the terminal, and
wherein the AMF set is selected based on the second information.

5. A method performed by a terminal in a wireless communication system, the method comprising:
transmitting, to an access network entity in the wireless communication system, a first message including first information for indicating a first access and mobility management function (AMF) and a registration request message, the first information including an AMF set identifier and an AMF identifier; and
receiving, from the access network entity, a second message as a response to the registration request message,
wherein the AMF set includes a plurality of AMFs based on network slices supported by each of the AMFs, and
wherein the AMF set identifier is used for selection of the AMF set.

6. The method of claim 5, wherein a second AMF is selected from the AMF set based on at least one of availability of at least one AMF included in the AMF set or load balancing across the at least one AMF included in the AMF set.

7. The method of claim 5, wherein the access network entity includes a radio access network entity or a non-3GPP inter-working function (N3IWF) entity.

8. The method of claim 5, wherein the first message further includes second information for a network slice selection assistance information (NSSAI) requested by the terminal, and
wherein the second information is considered for selecting the AMF set.

9. An access network entity in a wireless communication system, the access network entity comprising:
a transceiver; and
a controller configured to:
receive, from a terminal in the wireless communication system via the transceiver, a first message including first information for identifying an access and mobility management function (AMF) and a registration request message, the first information including an AMF set identifier and an AMF identifier,
select an AMF set based on the AMF set identifier,
select an AMF from the selected AMF set, and
transmit, to the terminal, via the transceiver, a second message as a response to the registration request message,
wherein the AMF set includes a plurality of AMFs based on network slices supported by each of the AMFs.

10. The access network entity of claim 9, wherein the AMF is selected from the AMF set based on at least one of availability of at least one AMF included in the selected AMF set or load balancing across the at least one AMF included in the selected AMF set.

11. The access network entity of claim 9, wherein the access network entity includes a radio access network entity or a non-3GPP inter-working function (N3IWF) entity.

12. The access network entity of claim 9, wherein the first message further includes second information for a network slice selection assistance information (NSSAI) requested by the terminal, and
wherein the AMF set is selected based on the second information for the NSSAI.

13. A terminal in a wireless communication system, the terminal comprising:
a transceiver; and
a controller configured to:
transmit, toward an access network entity, via the transceiver, a first message including first information for indicating a first access and mobility management function (AMF) and a registration request message, the first information including an AMF set identifier and an AMF identifier, and
receive, from the access network entity, via the transceiver, a second message as a response to the registration request message,
wherein the AMF set includes a plurality of AMFs based on network slices supported by each of the AMFs, and
wherein the AMF set identifier is used for selection of the AMF set.

14. The terminal of claim 13, wherein a second AMF is selected from the AMF set based on at least one of availability of at least one AMF included in the AMF set or load balancing across the at least one AMF included in the AMF set.

15. The terminal of claim 13, wherein the access network entity includes a radio access network entity or a non-3GPP inter-working function (N3IWF) entity.

16. The terminal of claim 13, wherein the first message further includes second information for a network slice selection assistance information (NSSAI) requested by the terminal, and wherein the second information for the NSSAI is considered for selecting the AMF set.

* * * * *